(12) United States Patent
Ghatate

(10) Patent No.: US 6,317,749 B1
(45) Date of Patent: Nov. 13, 2001

(54) METHOD AND APPARATUS FOR PROVIDING RELATIONSHIP OBJECTS AND VARIOUS FEATURES TO RELATIONSHIP AND OTHER OBJECTS

(75) Inventor: Bhalchandra Ghatate, Austin, TX (US)

(73) Assignee: Daman, Inc., Austin, TX (US)

(*) Notice: Subject to any disclaimer, the term of this patent is extended or adjusted under 35 U.S.C. 154(b) by 0 days.

(21) Appl. No.: 09/164,092

(22) Filed: Sep. 30, 1998

(51) Int. Cl.$^7$ .................................................. G06F 17/30
(52) U.S. Cl. ......................... 707/103; 707/100; 707/102
(58) Field of Search .................................. 707/103, 102, 707/100

(56) References Cited

U.S. PATENT DOCUMENTS

| | | | |
|---|---|---|---|
| 5,694,598 | * 12/1997 | Durand et al. | 707/103 |
| 5,905,982 | * 5/1999 | Carey et al. | 707/4 |
| 5,937,409 | * 8/1999 | Wetherbee | 707/103 |
| 5,956,725 | * 9/1999 | Burroughs et al. | 707/101 |
| 6,023,578 | * 2/2000 | Birsan et al. | 717/12 |

OTHER PUBLICATIONS

Integration Solutions for the Real–Time Enterprise: EIT–Enterprise Integration Template, Template Software (Table of Contents: 1 pg.; Contents: 3–28; Appendix I: 29–30; Appendix II: 31–32) no date.

Object Technology, A Manager's Guide, Second Edition by David A. Taylor, Ph.D., 2/98 (Contents: v–vii; Acknowledgements: ix–x; Introduction: xi–xii; How to Read the Book: xiii–xvi; Chapter 1–9: 1–158; Appendix: 159–175; Suggested Reading: 177–182; Glossary: 183–198; Index: 199–205.

Upstream, A White Paper, Business Process Engines, A New Catagory of Server Software, Will Burst the Barriers in Distributed Application Performance by John Rymer, Upstream Consulting (pp.: 1–16; Appendix: 16–19) no date.

ADT Mar. 1997—Viewed as an effective new way to identify core business requirements, business rule thinking for A/D is taking shape, Software Engineering (http://ww.adtmag.com/pub/mar97/softeng. (15 pgs.).

* cited by examiner

Primary Examiner—Jack Choules
Assistant Examiner—Cheryl Lewis
(74) Attorney, Agent, or Firm—Blakely, Sokoloff, Taylor & Zafman, LLP

(57) ABSTRACT

A method and apparatus for providing relationship objects and various features to relationship and other objects. According to one aspect of the invention, a system is described that includes a number of base objects that contain data describing disparate sources of an enterprise. In addition, the system includes a number of relationship objects that express relationships between different ones of the plurality of base objects.

66 Claims, 14 Drawing Sheets

| SUBCLASS LABEL | NAME(S) OF INSTANCE(S) |
|---|---|
| RELATIONSHIP SUBCLASS | <NAME1>,<NAME2> ... |
| BASE SUBCLASS A | |
| BASE SUBCLASS i | |
| DERIVATIVE SUBCLASS A | |
| DERIVATIVE SUBCLASS i | |
| . . . . | |

| RELATIONSHIP | RELATIONSHIP OBJECT TYPES | DESCRIPTION OF METHOD |
|---|---|---|
| IMPACTS | DATABASE_REL_OBJECT | IF "C" IS A COLUMN OF TABLE "T," THEN "C" IMPACTS "T" |
| | CONVERSION_REL_OBJECT | IF A CONVERSION MIGRATES DATA FROM "A" TO "B," THEN "A" IMPACTS "B" |
| | REPORT_REL_OBJECT | IF A REPORT WORKS OFF A TABLE "T," THEN "T" IMPACTS THE REPORT |
| DEPENDS | DATABASE_REL_OBJECT | IF "C" IS A COLUMN OF TABLE "T," THEN "T" DEPENDS ON "C" |
| | CONVERSION_REL_OBJECT | IF A CONVERSION MIGRATES DATA FROM "A" TO "B," THEN "B" DEPENDS ON "A" |
| | REPORT_REL_OBJECT | IF A REPORT WORKS OFF A TABLE "T," THEN THE REPORT DEPENDS ON "T" |
| DATA_ACCESS | DATABASE_REL_OBJECT | IF "T" IS A TABLE, THEN CREATE AN OBJECT OF THE DATABASE READER TYPE FOR "T" AND RETURN IT |
| | CONVERSION_REL_OBJECT | IF "C" IS A CONVERSION, THEN CREATE AN OBJECT OF THE CONVERSION READER TYPE FOR "C" AND RETURN IT |
| | REPORT_REL_OBJECT | IF "R" IS A REPORT, THEN CREATE AN OBJECT OF THE REPORT READER TYPE FOR "R" AND RETURN IT |

FIG. 13B

| Step# | Processed List | To Be Processed List | Current Object | Relationship | Description of step |
|---|---|---|---|---|---|
| 1 | | column_object 1350 | | | |
| 2 | | | column_object 1350 | Database_Rel_Object::Impacts | |
| 3 | | table_object 1345 | column_object 1350 | Report_Rel_Object::Impacts | |
| 4 | | table_object 1345 | column_object 1350 | Conversion_Rel_Object::Impacts | |
| 5 | column_object 1350 | table_object 1345 | | | move the current object to Processed list |
| 6 | " | | table_object 1345 | Database_Rel_Object::Impacts | get the current object from the To Be Processed list |
| 7 | " | | table_object 1345 | Report_Rel_Object::Impacts | |
| 8 | " | | table_object 1345 | Conversion_Rel_Object::Impacts | |
| 9 | column_object 1350, table_object 1345 | table_object 1360 | | | move the current object to Processed list |
| 10 | " | | table_object 1360 | Database_Rel_Object::Impacts | get the current object from the To Be Processed list |
| 11 | " | | table_object 1360 | Report_Rel_Object::Impacts | |
| 12 | " | report_object 1370 | table_object 1360 | Conversion_Rel_Object::Impacts | |
| 13 | column_object 1350, table_object 1345, table_object 1360 | report_object 1370 | | | move the current object to Processed list |
| 14 | " | | report_object 1370 | Database_Rel_Object::Impacts | get the current object from the To Be Processed list |
| 15 | " | | report_object 1370 | Report_Rel_Object::Impacts | |
| 16 | " | | report_object 1370 | Conversion_Rel_Object::Impacts | |
| 17 | | | | | |

FIG. 15

METHOD AND APPARATUS FOR PROVIDING RELATIONSHIP OBJECTS AND VARIOUS FEATURES TO RELATIONSHIP AND OTHER OBJECTS

CROSS-REFERENCE TO RELATED APPLICATIONS

None.

BACKGROUND OF THE INVENTION

1. Field of the Invention

The invention relates to the field of computer systems. More specifically, the invention relates to object technology.

2. Background Information

Most multi-user systems are now built on top of special programs, called database management systems, that are designed to manage simultaneous access to shared data. Database management programs do more than just control access to data stored in files; they also store relationships among the various data elements. The way these relationships are stored is critical to understanding the generations of databases that have come and gone in corporate environments. Early database management systems adopted the approach of storing direct references among data elements, allowing data to be retrieved through a process called navigational access. This approach supports fast retrieval of related information because each piece of stored information includes the effective locations of all relayed information.

One early database modeling technique, known as the hierarchical model, represents data items, called records, in tree structures. For example, a department can include records for the positions it contains and the equipment checked out to it. Each position, in turn, can be associated with a list of responsibilities and a list of employees in the department holding that position. A subsequent extension of the hierarchical model, the network model, allows data to be interconnected freely, with no requirement that it fit into a simple tree structure.

The hierarchical and network database models make it easy to represent simple relationships among data elements and provides fast access to the data. But there is a cost: Accessing the data in a way other than the one supported by the predefined relationships is slow and inefficient. Worse yet, the data structures are hard to track, maintain, and modify.

A newer database modeling technique, the relational model, addresses these problems by separating the data from the information about complex relationships. Particularly, all data is stored in simple tables, with basic relationships among data items being expressed as references to values in other tables. For example, each entry in an equipment table can contain a value indicating which department it belonged to. This approach to linking data in a database management system is called associative access because it relies on content rather than locations to link data elements together. Along with a new model for accessing data, the relational database management system also makes possible a new syntax, the Structured Query Language (SQL), that allows information in an relational database management system to be accessed in all possible locations.

Although the relational model is much more flexible than its predecessors, it extracts a steep price for the flexibility. The information about complex relationships that was separated from the database must be expressed as procedures in every program that accesses the database. This separation is a clear violation of the independence required for software modularity. The shift from navigational to associative access also extracts a serious performance penalty for complex data because it takes much longer to locate related information by searching for content rather than jumping to calculated addresses.

Despite these drawbacks, the flexibility of relational databases has proliferated through the industry. Although vast quantities of data continues to be managed in network databases, hierarchical databases, and unstructured files, these are the legacy of previous generations rather than reflections of current practice. Relational databases represent the dominant database management system technology today, and most new applications are constructed using relational systems.

Of course, having data scattered across several generations of database management system technology presents its own set of problems. It is very hard for individual applications to integrate data across such radically different technologies, which means that getting any kind of management overview is still difficult. One approach to solving this problem is a relational database that is used to pull together selected data from many different storage locations into a single repository with a common access mechanism (referred to as a relational data warehouse). The relational data warehouse does not, in itself, solve the problem of integrating data from divergent sources. But it does allow that problem to be solved only once, using custom procedures to pull the data together. Once this has been done, all the combined data can be accessed in a uniform manner, using SQL and other standard tools.

FIG. 1 is a block diagram illustrating the use of a relational data warehouse to integrate disparate sources, including data sources (a relational database and CORBA) and applications (a legacy application and a conversion application). In FIG. 1, the relational data warehouse uses the relational database tables and stored procedures to store relationships within and between the disparate integration sources.

The relational data warehouse is a reasonable step toward data integration, but it's a solution that introduces problems of its own. For example, the need to express relationships as separate procedures in every program that accesses the relational database has caused problems. In particular, different procedures have been added overtime by different programmers; at different times; using different programming languages; for different applications and integration sources; to express different relationships; etc. In addition, as these procedures are being added to the system, there is no mechanism or infrastructure to provide and/or force commonality between these procedures. Since an adaptive integrated view requires the ability to collect and execute different combinations of these procedures, such a view cannot be provided.

For example, a first programmer wishing to express a first relationship between the relational database and the legacy application of FIG. 1 writes a first procedure. However, a second programmer wishing to express a second relationship between the legacy application and the conversion application of FIG. 1 writes a second procedure (perhaps in a second language) having a different format (e.g., requiring a different number and/or type of inputs, providing a different number and/or type of outputs, etc.). In addition, a third programmer wishing to express a relationship between various items in a given integration source writes yet a third procedure that does not necessarily have a format common to the first and second procedures. As this process continues, a morass of procedures expressing different relationships between different items and/or different integration sources and having different formats is created.

The lack of commonality between these procedures makes them difficult, if not impossible, to track, maintain, and/or reuse. Thus, there is no reasonable mechanism by which a user can locate, much less execute, all procedures across the enterprise that express a certain type of relationship. For example, a user interested in a particular type of relationship expressed by the first and third procedures above would need know of both procedures, be able to locate both procedures, and know the format of both procedures. Thus, this inability to locate and execute different combinations of the procedures across the interface therefore prevents the provisions of adaptive integrated views.

In addition, this morass of procedures 1) limits adaptability; 2) provide little support for reusability; 3) leads to duplication of functionality; and 4) results in an inability to predict the result of changing an integration source. Specifically, a programmer unfamiliar with the work of another programmer (see reasons given above) will end up writing a procedure very similar to one that already exists. Thus, a request for the expression of a given relationship results in new procedures being added, except in the rare cases when an existing procedure is identified and the programmer can verify the procedure can be changed without disrupting other parts of the system.

Additionally, since the procedures interface with the integration sources and/or other procedures, changing a given integration source or procedure can affect any number of other integration sources and/or procedures. However, it often cannot be determined what procedures and/or other integration sources will be affected by such changes. For example, a first stored procedure may generate a report from a first integration source. This first procedure may use a second procedure when generating that report (e.g., the second procedure may be used for converting date information from a given format to the Julian format). Thus, the first procedure depends on the first integration source and the second procedure. Although this dependency exists, there is no mechanism for readily exposing these dependencies. As a result, programmers are reluctant to make any changes, but instead attempt to extend integration sources and/or write new procedures.

BRIEF SUMMARY OF THE INVENTION

A method and apparatus is described for providing relationship objects and various features to relationship and other objects. According to one aspect of the invention, a system is described that includes a number of base objects that contain data describing disparate sources of an enterprise. In addition, the system includes a number of relationship objects that express relationships between different ones of the plurality of base objects.

BRIEF DESCRIPTION OF THE DRAWINGS

The invention may best be understood by referring to the following description and accompanying drawings which are used to illustrate embodiments of the invention. In the drawings:

FIG. 13B is a table providing a description of the relationship methods (IMPACTS, DEPENDS, and DATA_ACCESS) for different types of base objects according to one embodiment of the invention;

FIG. 15 is a table illustrating the processing of the exemplary request COLUMN_OBJECT 1350 →PERFORM_RELATIONSHIP (impacts) according to one embodiment of the invention.

DETAILED DESCRIPTION OF THE INVENTION

A method and apparatus is described for providing relationship objects and various features to relationship and other objects. In the following description, numerous specific details are set forth to provide a thorough understanding of the invention. However, it is understood that the invention may be practiced without these specific details. In other instances, well-known structures and techniques have not been shown in detail in order not to obscure the invention.

Figure 1:
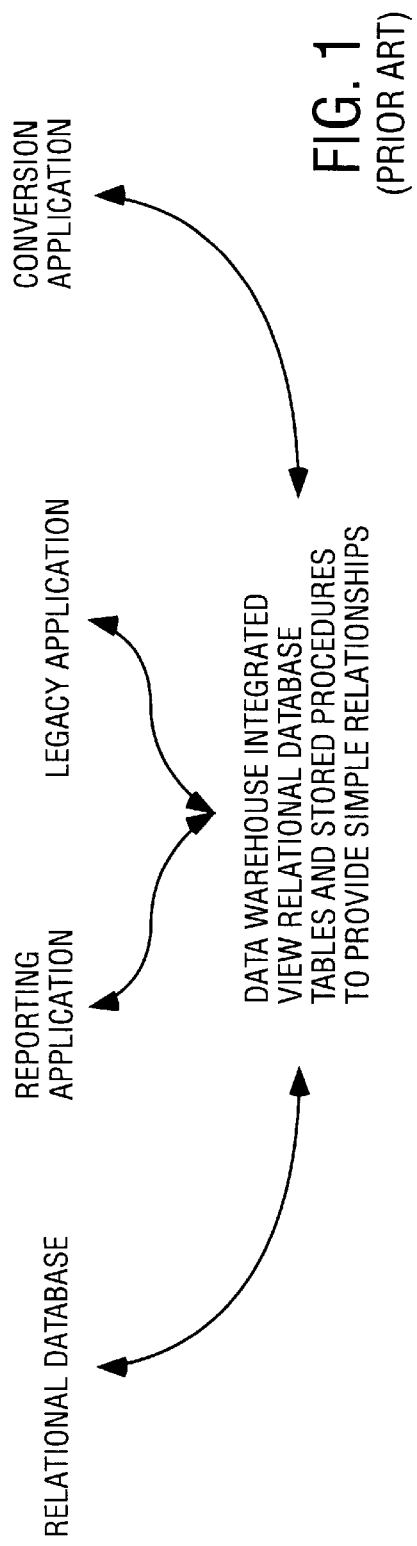
FIG. 1 is a block diagram illustrating the use of a relational database to data warehouse disparate integration sources, including data sources (a relational database and CORBA) and applications (a legacy application and a conversion applications)
Figure 2:
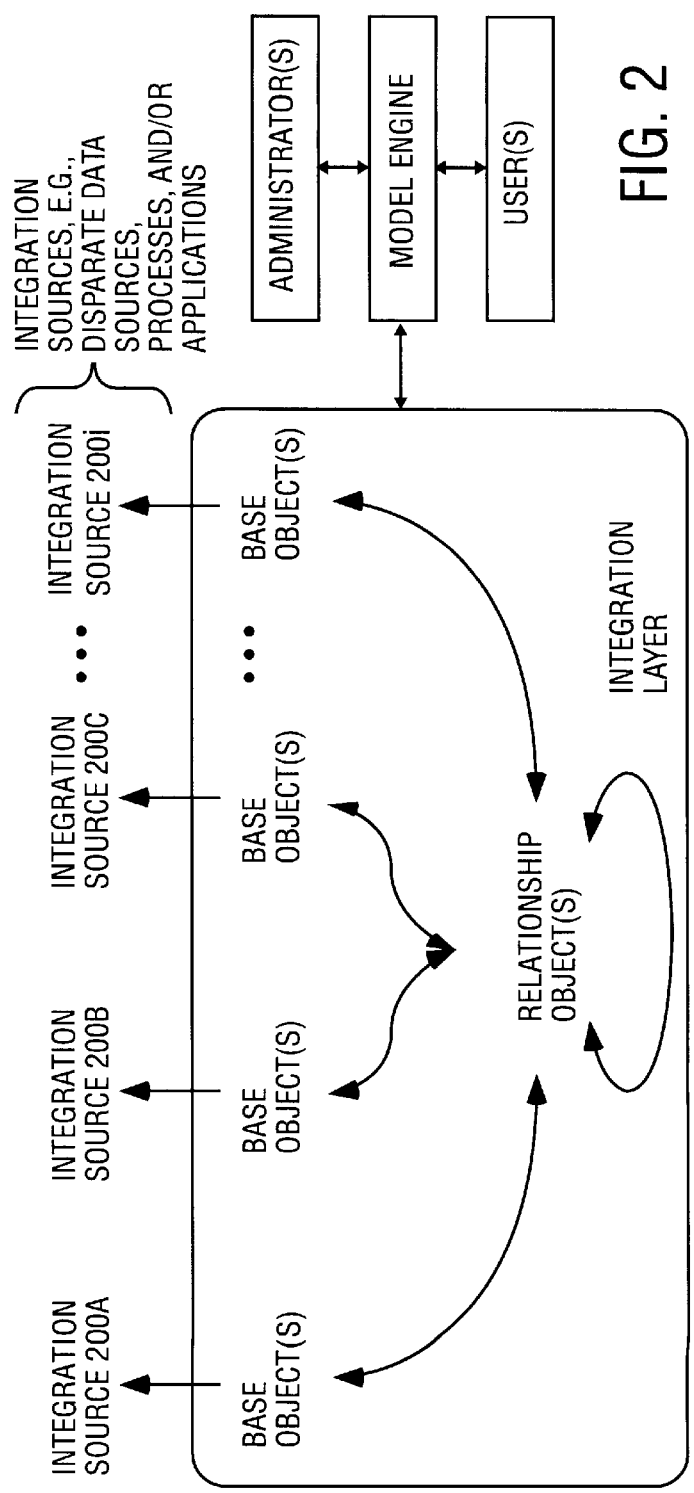
FIG. 2 is a block diagram illustrating a object oriented data warehouse according to one embodiment of the invention.

FIG. 2 is a block diagram illustrating a object oriented data warehouse according to one embodiment of the invention. FIG. 2 represents a set of disparate data sources, processes and/or applications being used by an exemplary enterprise. In FIG. 2, the disparate data sources, processes and/or applications are referred to as integration sources 200A–i. In contrast to the relational database tables and stored procedures used to implement the relational data warehouse in FIG. 1, FIG. 2 shows an integration layer formed with object technology providing the integrated view.

In one embodiment, the integration layer is composed of two types of objects, base objects and relationship objects. The base objects describe the disparate integration sources A–i. The relationship objects describe relationships between the base objects, as well as relationships between the relationship objects themselves.

Specifically, the common concept of encapsulation in object technology is to place data with its' associated methods together in a single object. In contrast, the integration layer is developed such that those methods that express a relationship (referred to herein as "relationship methods") are placed in separate objects—the relationship objects. In this manner, a higher degree of encapsulation is provided. While relationship methods within relationship objects are similar to methods commonly found in object technology in that they can be applied to the objects that contain them, relationship methods within relationship objects are different in that they often are applied to other objects, including base objects and other relationship objects.

FIG. 2 also shows a model engine through which administrator(s) and user(s) can access the integration layer. The model engine is a library of functions that allows for interfacing (e.g., creating, searching, navigating, browsing, manipulating, etc.) with the objects in the integration layer. For example, the administrator(s) can develop and maintain the integration layer, as well as define security access. The user(s), for example, can navigate and/or query the model provided by the integration layer. Thus, the model engine can include various administrator and user interfaces (e.g., business tools, custom front-end tools, custom back-end tools, etc.). Of course, the integration layer and model engine are stored and executed on a computer system (either a single computer or a computer network). Such a computer system stores and communicates the model engine and/or integration layer using machine readable media, such a magnetic disks, optical disks, random access memory, read only memory, carrier waves, signals, etc. As with any method in an object, the code for relationship methods can be: 1) in the objects themselves; or 2) as part of the model engine and pointed to.

As described later herein, the integration layer provides an adaptive integrated view of the enterprise by allowing different types of relationship methods across the enterprise to be located and applied. In addition, the integration layer can be used to provide mechanisms to determine how the disparate sources are interrelated, as well as how the objects of the integration layer are interrelated. Through these interrelationships the result of changing an integration source and/or part of the integration layer can be determined. This ability provides for reusability of existing items and for maintenance of the system.

The integration layer is defined by an object oriented infrastructure. As used herein, a relationship that a user and/or administrator is currently interested in is referred to as the current relationship of interest. This object oriented infrastructure includes various features that are suited for using and manipulating the base and relationship objects. For example, the following features are provided:

1. ability to distinguish which objects in the integration layer are relationship objects;
2. ability to distinguish which relationship objects include which relationship methods;
3. ability to identify which relationship objects include the current relationship of interest;
4. if and when there are multiple relationship methods in a given relationship object, ability to select those relationship method(s) required for the current relationship of interest;
5. ability to create a result set containing the results of applying all required relationship methods on all required objects throughout the integration layer needed for the current relationship of interest; and
6. ability to interface with the methods of the relationship objects through exposed metadata contained therein.

However, it is understood that these various features can be used for any object oriented infrastructure. In other words, it is understood that these features make up separable aspects of the invention that can be used in different contexts. Thus, while these features are described with reference to the base and/or relationship objects, it is understood that these features could be provided for any type of objects, and the invention is not limited to supporting the above features in relationship objects, much less in an object oriented data warehouse. Furthermore, it is understood that not all of the above features will be present in all embodiments of the invention.

One aspect of the invention is to provide for these features in objects, such as relationship objects. According to this aspect of the invention, any techniques can be used to provide the above features. According to another aspect of the invention, the actual technique used to provide one or more of the above features is inventive in and of itself. As such, various techniques to provide the above features are described below.

Figure 3:
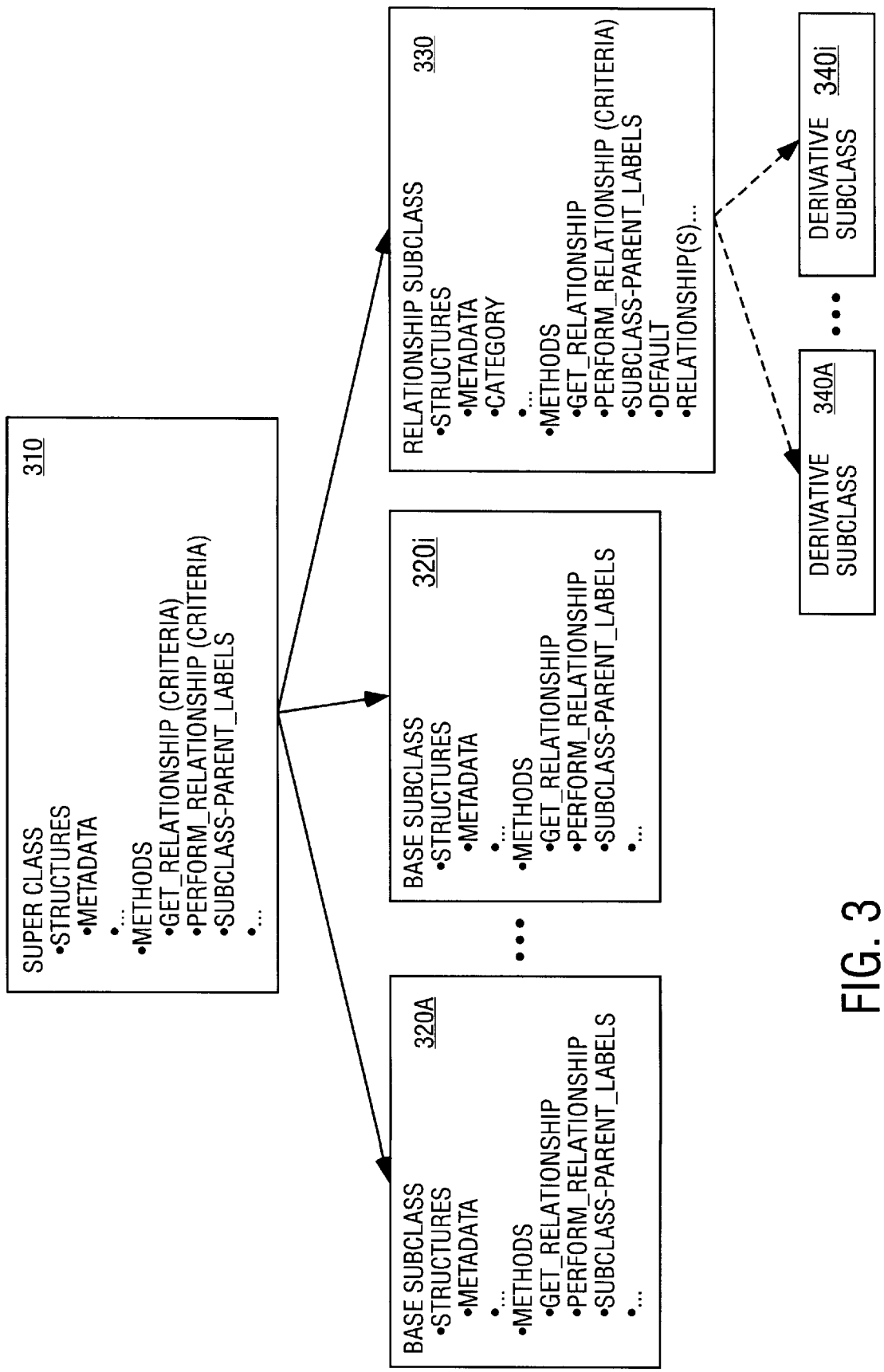
FIG. 3 is a block diagram illustrating an exemplary object oriented infrastructure for the integration layer of FIG. 2 according to one embodiment of the invention.

FIG. 3 is a block diagram illustrating an exemplary object oriented infrastructure for the integration layer of FIG. 2 according to one embodiment of the invention. FIG. 3 shows a class hierarchy having a super class 310 and a first level of subclasses. The first level of subclasses includes base subclass(es) 320A–320i and a relationship subclass 330. FIG. 3 also shows that the relationship subclass 330 can optionally have derivative subclass(es) 340A–i. As with any object technology, additional subclasses and/or derivative subclasses can be included (e.g., derivatives of the base subclasses, additional relationship type subclasses, other types of subclasses, etc.).

Instances of the base subclasses 320A–i (and any derivatives thereof) are used to form the base objects illustrated in FIG. 2, whereas instances of the relationship subclass 330 (and any derivatives thereof) are used to form the relationship objects illustrated in FIG. 2.

The super class 310 is made up of structures and methods. The structures of the super class 310 can take any form (e.g. linked list, array, tree, etc.). In the embodiment shown in FIG. 3, the super class 310 includes a structure referred to as METADATA. As is well known in the art, metadata is data that describes other data. FIG. 3 also shows the methods of the super class 310 include GET_RELATIONSHIP, PERFORM_RELATIONSHIP, and SUBCLASS-PARENT_LABEL As is well known in the art, instances of these classes (known as objects) have the characteristics of polymorphism and inheritance. Thus, the structures and methods of the super class 310 are inherited by the subclasses 320A–i, 330, and 340A–i. As is also well known in the art, any subclass can override an inherited method with a different method. As described herein, the GET_RELATIONSHIP and PERFORM_RELATIONSHIP methods are typically inherited, whereas the SUBCLASS-PARENT_LABEL method is typically overridden. As is also well known in the art, any subclass or derivative can add additional methods. For example, the relationship subclass 330 includes the additional method referred to as DEFAULT.

Although a more detailed description is provided later herein, it is thought worthwhile at this point to provide a brief description of the structures and methods of the class hierarchy of FIG. 3. The SUBCLASS-PARENT_LABEL method aids in the creation of a set of object tracking structure(s). These object tracking structure(s) are data structures that are used for identifying the relationship objects (instances of the relationship subclass 330 and derivatives thereof, as well as other relationship type subclasses). Thus, the object tracking structure(s) provide, among other things, the ability to distinguish which objects in the integration layer are relationship objects.

The CAREGORY structure of the relationship subclass 330 provides the ability to distinguish which relationship objects include which the relationship methods. In operation, a given relationship object will contain one or more types of relationship methods. In one embodiment, each of these types of relationship methods are associated with an identifier (e.g., a keyword). For a given relationship object, the identifiers associated with the types of relationship methods contained in that relationship object are stored in the CAREGORY structure of that relationship object. Thus, the identifiers in the CAREGORY structures of relationship objects distinguish which relationship objects include which relationship methods.

The GET_RELATIONSHIP method receives as an input parameter CRITERIA. The GET_RELATIONSHIP method returns a collectible (a single object or a collection of objects) containing all relationship objects that meet the CRITERIA parameter. This CRITERIA parameter can include the previously described identifiers that distinguish the different types of relationship methods. In this case, the GET_RELATIONSHIP method searches the CAREGORY structures of the relationship objects for identifiers that match the CRITERIA parameter. In this manner, the CAREGORY structure and GET_RELATIONSHIP method provide the ability to identify which relationship objects include the current relationship of interest.

The DEFAULT method can take on different forms depending on the implementation of the invention. For example, one form of the DEFAULT method is the expression of a relationship. Another form of the DEFAULT method is a method which, when applied, selects one or more other relationship methods in the object. When the DEFAULT method is written to perform this type of selection, the DEFAULT method is referred to as a RELATIONSHIP_SELECTION method. Thus, if and when there are multiple relationship methods in a given relationship object, the RELATIONSHIP_SELECTION method provides the ability to select those relationship method(s) required for the current relationship of interest.

The PERFORM_RELATIONSHIP method also receives as an input parameter CRITERIA. The PERFORM_RELATIONSHIP method:

1) performs the GET_RELATIONSHIP method; and
2) applies the DEFAULT methods of all relationship objects returned by the GET_RELATIONSHIP method in a manner that provides the results that satisfy the current relationship of interest.

Thus, the PERFORM_RELATIONSHIP method (in combination with the DEFAULT method) provides the results of applying all required relationship methods on all required objects throughout the integration layer needed for the current relationship of interest.

The METADATA structures of the base subclasses 320A–i can be used for storing any type of data, including data that describes the integration sources for which the base subclasses were created. The METADATA structures of the relationship type subclasses (and derivatives thereof) can be used for storing any type of data, including data that describes and/or is used by the relationship methods. The exposing of this metadata through an interface (e.g., user, administrator, application programming interface, etc.) provides for the ability to interact with the relationship objects through this metadata. Having provided an overview of the class hierarchy structure in FIG. 3, we will now turn to a more detailed description of certain aspects and embodiments of the invention.

Figure 4A:
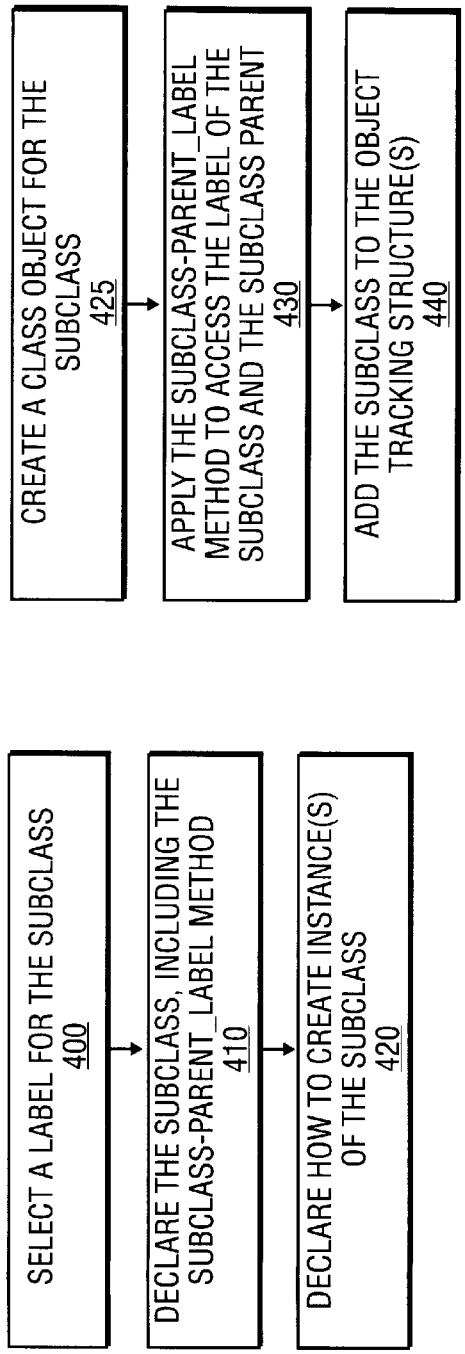
FIG. 4A is a flow diagram illustrating the definition of a subclass and instances of that subclass according to one embodiment of the invention.
Figure 4B:
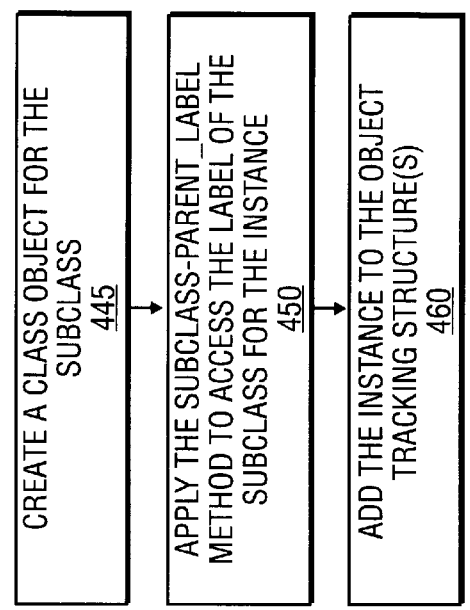
FIG. 4B is a flow diagram illustrating certain aspects of the initialization of a subclass according to one embodiment of the invention.
Figure 4C:
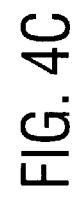
FIG. 4C is a flow diagram illustrating the initialization of an instance of a subclass according to one embodiment of the invention.

FIGS. 4A–C are flow diagrams illustrating the defining and initializing of subclasses and instances of the class hierarchy of FIG. 3 according to one embodiment of the invention. The flow diagrams of FIGS. 4A–C apply to the classes of the integration layer, including the base and relationship subclasses.

FIG. 4A is a flow diagram illustrating the definition of a subclass and instances of that subclass according to one embodiment of the invention. In one embodiment of the invention, it is contemplated that different programmers will be creating objects at different times and/or for different integration sources. As a result, different programmers that are not in direct communication (e.g. they are working at different times, they are working on different projects, etc.) will be adding subclasses. For this and other reasons, it is desirable to have a set of central structure(s) for tracking the objects of the integration layer. To this end, one or more object tracking structures are created. While any number of different object tracking structures could be used, a few examples of object tracking structures are given herein. For example, in one embodiment of the invention a subclass label structure, a class hierarchy structure, and an instances structure are used. These exemplary structures will be described in more detail below.

In block 400, a unique label for the subclass is created and control passes to block 410. When a programmer wishes to create a subclass, the programmer first creates a label that is not being used. With reference to the exemplary object tracking structures mentioned above, the subclass label structure is a centralized repository for the programmers to store labels currently being used to distinguish the different subclasses. In block 400, a given programmer and/or programming tool accesses the subclass label structure to select a subclass label that is not already being used. When the programmer identifies a label that is not currently being used, the programmer adds this label to the subclass label structure.

As shown in block 410, the subclass is declared and control passes to block 420. Since the general manner of defining a subclass is well known, only those parts that relate to aspects of the invention will be described. In particular, assuming that the class hierarchy of FIG. 3 is used, the programmer and/or programming tool will need to specify an overriding SUBCLASS-PARENT_LABEL method. The SUBCLASS-PARENT_LABEL method is written to output the label for the subclass (selected in block 400) and the label of the parent class of that subclass. Since the subclass is being defined, the parent for the subclass will be readily identifiable. As such, the label for the parent of the subclass can also be identified and incorporated in the SUBCLASS-PARENT_LABEL method. As described later herein, the SUBCLASS-PARENT_LABEL method will be used during subclass initialization and instances initialization to update the object tracking structures.

As shown in block 420, the manner of creating instance(s) of the subclass is declared. In one embodiment of the invention, the objects in the integration layer include INIT and INITILIZE_INSTANCES methods. The INIT methods for the classes are all applied at runtime to perform class initialization as described with reference to FIG. 4B, while the INITILIZE_INSTANCES methods are applied during instance initialization as described with reference to FIG. 4C.

FIG. 4B is a flow diagram illustrating certain aspects of the initialization of a subclass according to one embodiment of the invention. In block 425, an instance of the subclass is created (referred to in as the class object) and control passes to step 430.

In block 430, the SUBCLASS-PARENT_LABEL method of the class object is applied to identity the label of the subclass and of its' parent. From block 430, control passes to block 440.

Figures 5, 6:
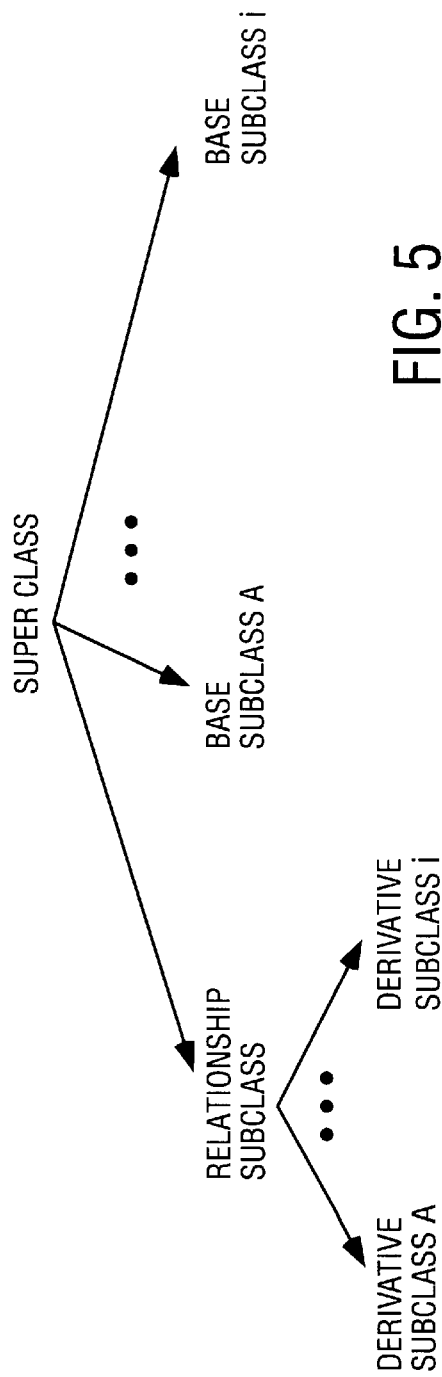
FIG. 5 is a conceptual diagram illustrating an exemplary class hierarchy structure according to one embodiment of the invention.
FIG. 6 is a conceptual diagram illustrating the instances structure according to one embodiment of the invention.

As shown in block 440 of FIG. 4B, the subclass being initialized is added to the object tracking structure(s). To continue the description of the exemplary object tracking structure(s), FIG. 5 is a conceptual diagram illustrating an exemplary class hierarchy structure according to one embodiment of the invention. As shown in FIG. 5, the class hierarchy structure expresses in some form a top-down representation of the hierarchy of the classes with reference to the subclass labels. During block 430 of FIG. 4B, the parent label identified by the SUBCLASS-PARENT_LABEL method is used to identify the position of the parent class in the class hierarchy structure. Subsequently, the subclass label is added to the class hierarchy structure in the appropriate manner to identify its relationship to the parent. For example, in one embodiment of the invention the class objects are stored in the class hierarchy structure. The class hierarchy structure creates a central repository in which all integration layer classes are inserted. As described later herein, this central repository is later used for locating the relationship type subclass(es) and derivatives thereof.

In addition to adding the subclass to the class hierarchy structure, the subclass label is also added to the instances structure. FIG. 6 is a conceptual diagram illustrating the instances structure according to one embodiment of the invention. The instances structure is a central repository used to record all of the instances by class. As shown in FIG. 6, each subclass label and the instances of that subclass are stored in the instances structure. While any number of well known techniques can be used for implementing the instances structure, one embodiment of the invention uses a hash dictionary.

In addition, one embodiment of the invention uses numbers as the labels for the subclasses, but associates more descriptive labels with these number labels using features of a programming language. For example, the SUBLASS-PARENT_LABEL method could be provided as follows:
 #define TYPE_RELATIONSHIP_CLASS 1001
 class RELATIONSHIP_CLASS: public SUPER_CLASS
 {
  SUBCLASS-PARENT_LABEL(RELATIONSHIP_CLASS, SUPER_CLASS, TYPE_RELATIONSHIP_CLASS)
 }
 long SUBCLASS-PARENT_LABEL ( ) (return TYPE_RELATIONSHIP_CLASS ;)
 long SUBCLASS-PARENT_LABEL (long type) (return type== 11 ||SUPER_CLASS: SUBCLASS-PARENT_LABEL (type))

The combination of the class hierarchy structure and the instances structure provides a mechanism by which all instances of the relationship class (and its derivatives) can be identified. As previously described, alternative embodiments can use different structures. For example, rather than using the SUBCLASS-PARENT_LABEL method, data identifying the labels of a subclass and of its' parent could be expressed as data in a structure of the subclass. As another example, rather than generating the class hierarchy and/or instances structure during class and instance initialization, alternative embodiments require the class hierarchy and/or instances structures be maintained by the programmers during the definition of the class(es) and instance(s). As another example, rather than having a subclass label structure, a class hierarchy structure, and an instances structure, an alternative embodiment could combine one or more of these into one structure. As another example, rather than using structure(s) that track all subclass and instances of the integration layer, an alternative embodiment could implement structures that track only certain subclasses and/or instances (e.g., only the relationship type subclasses and/or instances). As another example, rather than implementing a class hierarchy structure, an exhaustive search using the bottom-up view of the class hierarchy provided by the SUBCLASS-PARENT_LABEL methods is used to locate the relationship class(es) and any derivatives thereof.

FIG. 4C is a flow diagram illustrating the initialization of an instance of a subclass according to one embodiment of the invention. For example, in the embodiment described above the INITIALIZE_INSTANCES method is applied to create the instance. In block 445, an instance of the subclass is created and control passes to block 450.

With reference to block 450 of FIG. 4C, the SUBCLASS-PARENT_LABEL method of the instance is applied to identify the label of the subclass. Block 450 is performed in the same manner as block 425. From block 450, control passes to block 460.

In block 460, the instance is added to the object tracking structure(s). To continue the description of the exemplary object tracking structure(s), the label identified in block 450 is used to locate the instance's subclass in the instances structure. The name of the new instance is then added to the instances structure under that subclass label.

Having described those aspects of subclass and object creation common to both base and relationship classes in the integration layer, aspects that are typically unique to the relationship type subclasses (and derivatives thereof) will now be described.

Figure 7:
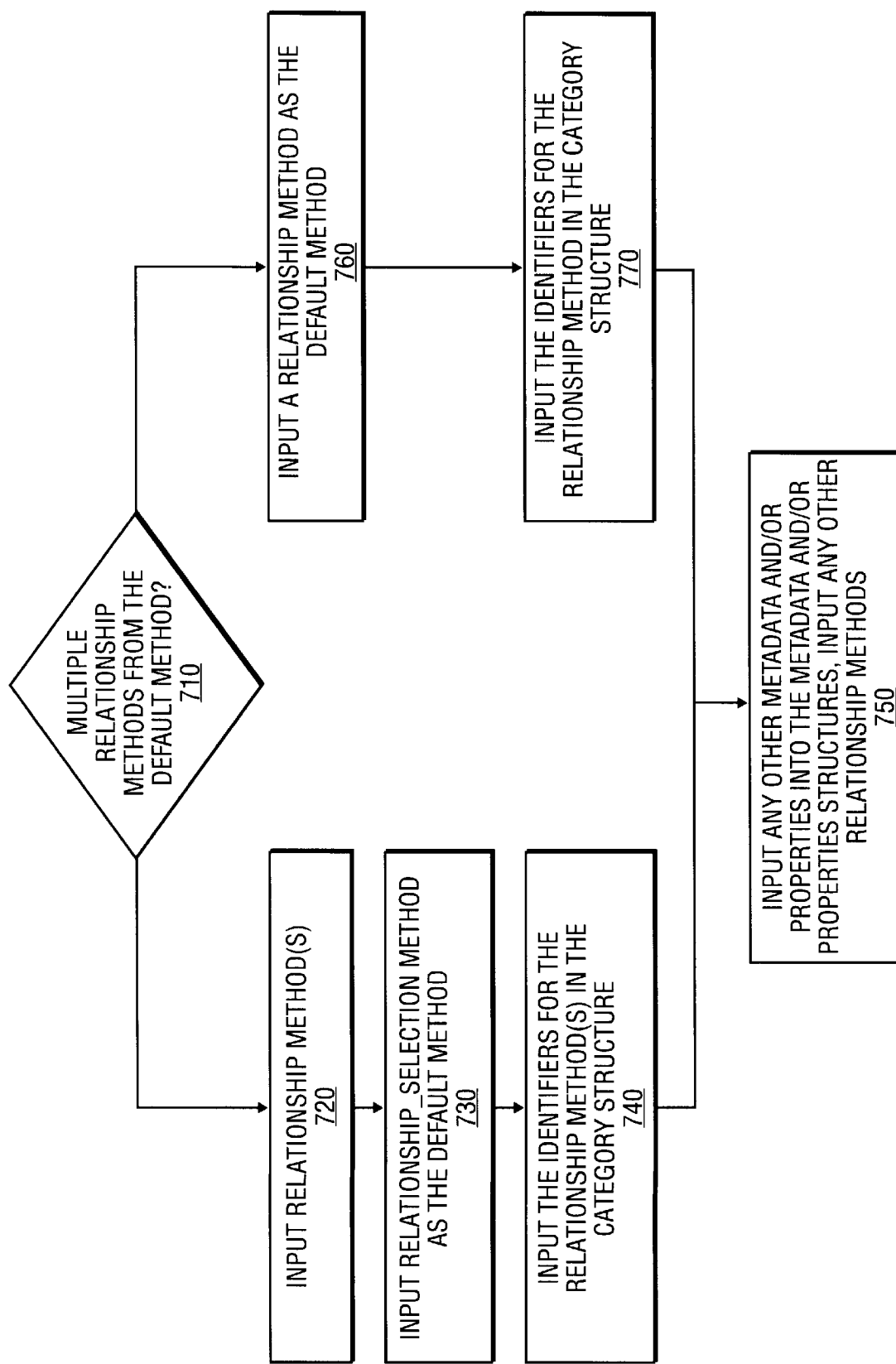
FIG. 7 is a flow diagram illustrating the defining of a relationship type subclass (or derivatives thereof) according to one embodiment of the invention.

FIG. 7 is a flow diagram illustrating the defining of a relationship type subclass (or derivatives thereof) according to one embodiment of the invention. The flow diagram of FIG. 7 would be performed for the relationship subclass 330 (and derivatives thereof) as part of block 410 of FIG. 4A. In block 710, it is determined if the subclass will allow for a selection from multiple relationship methods responsive to the DEFAULT method. If the subclass is to provide for the selection from multiple relationship methods responsive to the DEFAULT method, control passes to block 720. Otherwise, control passes to block 760.

In block 720, the relationship methods are input into the subclass and control passes to block 730. As shown in block 730, a RELATIONSHIP_SELECTION method is input as the DEFAULT method and control passes to 740. As previously described, the relationship selection method is a method which uses certain criteria in order to select which, if any, of the relationship methods within the relationship object should be applied. The manner of implementing a RELATIONSHIP_SELECTION method will be further described herein with reference to FIG. 10.

In block 740, identifiers for the relationship methods of block 720 are input into the CAREGORY structure of the relationship object and control passes to block 750. For example, in one embodiment of the invention, if a type of relationship method referred to herein as "impacts" is included in the relationship object, then the keyword "impacts" is added to the CAREGORY structure for the relationship object. As previously described, the inclusion of the identifiers (e.g., keywords) for the relationship methods contained within a given relationship object, allows the system to identify those relationship objects that contain a given type of relationship method.

Turning to block 760, a relationship method is input as the DEFAULT method and control passes to block 770. In block 770, the identifier for the relationship method input as the DEFAULT method in block 760 is entered into the CAREGORY structure of the relationship object. From block 770, control passes to block 750.

In block 750, any other metadata and/or properties are input into the METADATA structure of the subclass. In addition, any other relationship methods which are desired to be added are input. Subsequently, the definition of the subclass would be completed as part of block 410 of FIG. 4A.

While a particular flow is illustrated in FIG. 7, it is well known that the ordering of these blocks is not mandatory. In other words, as with all flow diagrams described herein, certain of the blocks may be performed in a different order and/or aspects of the blocks may be performed concurrently unless otherwise specified or implicitly required. Additionally, while one embodiment is described in which blocks 740 and 770 are performed, alternative embodiments described later herein do not perform blocks 740 and 770. In addition, while one embodiment is described in which block 710 is performed, alternative embodiments described later herein allow for only one of the two flows illustrated in FIG. 7.

Figure 8:
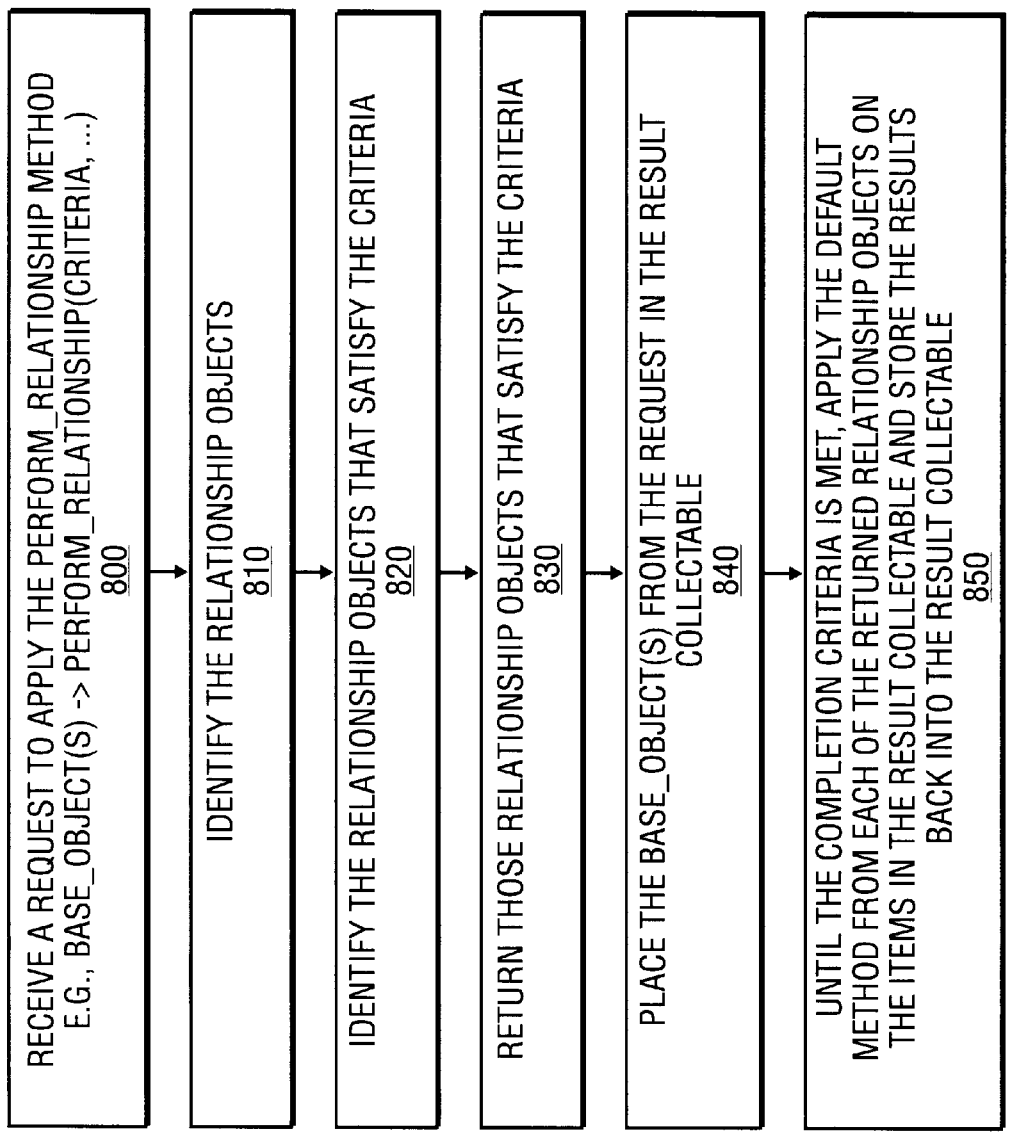
FIG. 8 is a flow diagram illustrating the application of the PERFORM_RELATIONSHIP method according to one embodiment of the invention.
Figure 9:
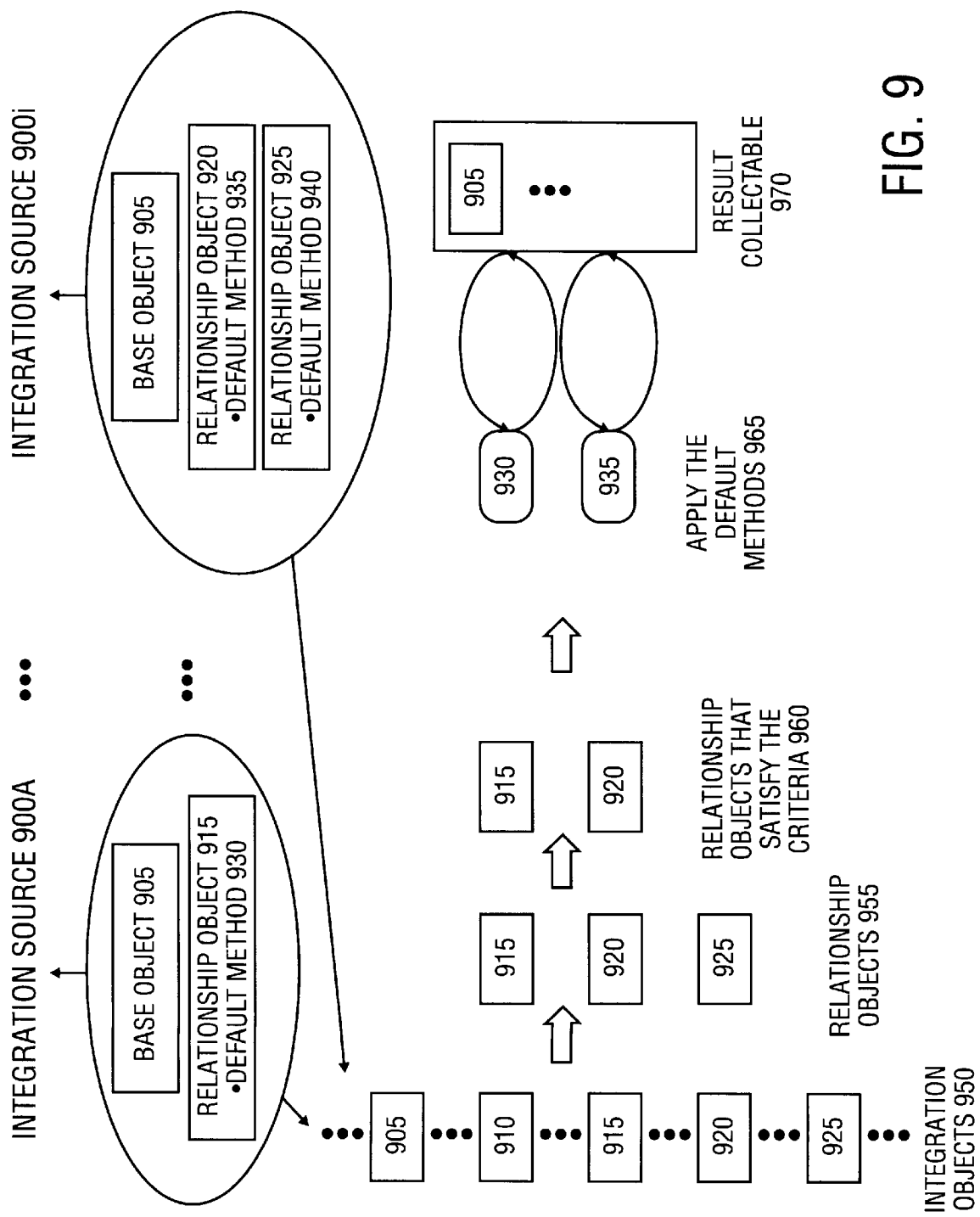
FIG. 9 is a conceptual block diagram illustrating an example of applying the PERFORM_RELATIONSHIP method according to one embodiment of the invention.

FIG. 8 is a flow diagram illustrating the application of the PERFORM_RELATIONSHIP method according to one embodiment of the invention, while FIG. 9 is a conceptual block diagram illustrating an example of the same. FIG. 9 illustrates integration sources 900A–i. In addition, FIG. 9 illustrates an integration layer including:

1) base objects 905 and 910 respectively containing metadata regarding the integration sources 900A and 900*i*;
2) a relationship object 915 containing a DEFAULT method 930 that expresses a relationship regarding the integration source 900A; and
3) relationship objects 920 and 925 respectively containing DEFAULT methods 935 and 940 that express relationships regarding the integration source 900i.

The objects of the integration layer are collectively referred to as the integration objects 950.

As shown in block 800 of FIG. 8, a request to apply the PERFORM_RELATIONSHIP method from a set of BASE_OBJECT(S) is received. In one embodiment of the invention, the syntax for this request is:

[COLLECTABLE]→PERFORM_RELATIONSHIP (CRITERIA, . . . )

In the above syntax, the text to the left of the arrow identifies the one or more objects from which to apply the PERFORM_RELATIONSHIP method, whereas the CRITERIA parameter of the PERFORM_RELATIONSHIP method is used to identify the relationship method(s) to be applied. The result of the above syntax is a collectible referred to as the result collectable.

More particularly, FIG. 9 illustrates an exemplary request to apply the PERFORM_RELATIONSHIP method of the base object 905 with the input parameter CRITERIA. With reference to the architecture shown in FIG. 2, this request is received by the model engine.

As shown in block 810 of FIG. 8, the relationship objects are identified and control asses to block 820. Block 810 is performed using the previously created object tracking structures. For example, with reference to FIG. 5, the label(s) for the relationship type subclass(es) and derivatives thereof can be accessed from the class hierarchy structure. With these label(s), the instances structure of FIG. 6 can be accessed to determine all instances of the relationship subclass(es). In this manner, all relationship objects can be identified. With reference to the example of FIG. 9, the relationship objects 955 are selected from the sum of the integration objects 950 using the object tracking structure(s).

While the identification of the relationship objects has been described with reference to the exemplary class hierarchy and instances structures, alternative embodiments which use different object tracking structure(s) will access those structures as necessary to identify the relationship objects.

In block 820, the relationship objects that satisfy the CRITERIA are identified and control passes to block 830. As described above, the CRITERIA used as the input parameter for the PERFORM_RELATIONSHIP method can be one or more of the identifiers inserted in the CAREGORY structure of relationship objects. As such, a search of the CAREGORY structures of the relationship objects to identify which contain the CRITERIA yields the relationship objects that contain relationship methods that express the relationship of interest.

While one embodiment is described in which the CAREGORY structure is used to identify the relationship objects, alternative embodiments can use any number of mechanisms. For example, one alternative embodiment uses a centralized structure (e.g., a table of relationship methods and associated objects) that is formed during initialization. As another example, an alternative embodiment uses a method as opposed to a structure. Yet another alternative embodiment uses SQL statements (e.g., as the CRITERIA) to select from a database which relationship objects to use.

In block 830, those relationship objects that satisfy the CRITERIA are returned and control passes to block 840. With reference to the example of FIG. 9, the relationship objects that satisfy the CRITERIA (960) are the relationship objects 915 and 920. It should be understood that the relationship objects 915 and 920 may have been written by different programmers, at different times, etc. In addition, it should be understood that the relationship objects 915 and 920 specify relationships regarding different integration sources (integration sources 900A and 900i). However, due to the class hierarchy used to create the integration layer, all relationship objects across the enterprise including relationship methods that satisfy the CRITERIA can be identified.

As a result, a programmer generating a relationship object for a given integration source need not be aware of the other relationship objects for the same and/or different integration sources in order to facilitate the integrated view of the enterprise and/or determine the interrelationships of the integration sources and/or objects in the integration layer. Particularly, with respect to the example of the first, second and third procedures given in the background, the relationships expressed by the first, second and third procedures could be implemented as relationship methods in relationship objects. As such, these relationship methods could be located across the enterprise (e.g., using the object track structure(s) and the CATEGORY structures).

Returning to block 840 of FIG. 8, the base object(s) of the request are added to the result collectable and control passes to block 850. With reference to the example of FIG. 9, the base object 905 has been added to the result collectable 970.

In block 850, the DEFAULT method from each of the relationship objects returned in block 830 is applied to all items in the result collectible (with the results being stored back into the result collectable) until certain completion criteria are met. As previously described, these default methods can each be a relationship method or a RELATIONSHIP_SELECTION method that causes one or more other relationship methods to be applied. The application of a relationship method can result in any form of data, including other base and/or relationship objects. Particularly, in one embodiment of the invention, the signature for the relationship methods is:

collection *name(collection *ptr, void*)

The completion criteria can differ based upon implementation. For example, certain embodiments may apply all relationship methods a certain number of times (e.g., once, twice, etc.) As another example, the relationship methods could be applied until the result collectable no longer increases in size. With reference to the example of FIG. 9, the DEFAULT methods 965 include the DEFAULT methods 930 and 935. The DEFAULT methods 930 and 935 are applied to the items in the result collectable 970. The results of applying the DEFAULT methods 965 are stored back in the result collectable 970.

Assuming the later exemplary completion criteria from above is used, the process of applying the DEFAULT methods 965 is continued on all items in the result collectable 970 until the result collectable no longer increases in size. Since the DEFAULT methods are applied on the result collectable until the result collectable no longer increases in size, the DEFAULT methods are also applied to the base and/or relationship objects added to the result collectable. In this manner, all of the relationships identified by the CRITERIA are collected in the result collectable, regardless of who created the relationship object, when the relationship object was created, for which integration source(s) the relationship object was created, etc.

Various techniques can be used for applying the relationship methods until the result collectable no longer increases in size. For example, one technique uses a "processed list" and a "to be processed list." Initially, the objects of the request are placed on the to be processed list and a first pass is performed in which each relationship method is applied these objects. As each object is processed, that object is moved from the to be processed list to the processed list. For each result generated during the first pass, the result is compared to the items on both lists to determine if the result is on either list. If the result is on the processed or to be processed list, the result is discarded. However, if the result is not on either list, the result is added to the to be processed list. If no results were added on the to be processed list during the first pass, then the process is complete. However, if there are items on the to be processed list, additional passes are performed in a similar manner.

In other exemplary embodiments, a single list is used. For example, in one embodiment the objects of the request are placed on the single list and the size of the list is recorded. A first pass is performed in which each relationship method is applied to the objects on the single list. For each result generated during the first pass, the result is compared to the items on the single list to determine if the result is on that list. If the result is on that list, the result is discarded. Otherwise, the result is added to the single list. After all relationship methods have been applied during the first pass, the size of the list is compared to the previously recorded size to determine if the list grew in size. If the list remained the same size, the result collectable is complete. Otherwise, additional passes are performed in a similar manner. In another exemplary embodiment, rather than recording the size of the single list, a flag is used to determine whether an additional pass is required (e.g., the flag is cleared prior to each pass and the flag is set when any result is added to the list during a given pass). In these embodiments, flags can be used to mark the new results (the results added to the list during the last pass). As such, these flags can be used to determine the results on which the relationship methods are to be applied during the next pass.

As a result of the infrastructure of the integration layer, the relationship methods have a common format even though different programmers created these methods at different times, for different integration sources, and/or to express different relationships. As a result, an adaptive integrated view can be provided because the infrastructure allows for the collection and application of different combinations of the relationship methods across the enterprise. By way of further example, again consider the example above in which the relationships from the first, second and third procedures in the background are expressed as relationship methods in relationship objects. With these relationship objects, a user interested in a particular type of relationship expressed by the first and third relationship methods above can not only locate both relationship methods, but can also apply both relationship methods through the DEFAULT method mechanism.

Since the relationship methods throughout the entire integration layer can be collected and applied as necessary, the expertise of particular individuals can be leveraged. In particular, each relationship method and/or object can be created by person(s) having expertise in that particular domain. For example, a person whose expertise lies in relational databases can create relationship objects for relational databases. Even though each relationship method and/or object is created by person(s) having expertise in a particular domain, any entity (e.g., a user, administrator, or program) can locate and apply that relationship method and/or object.

Figure 10:
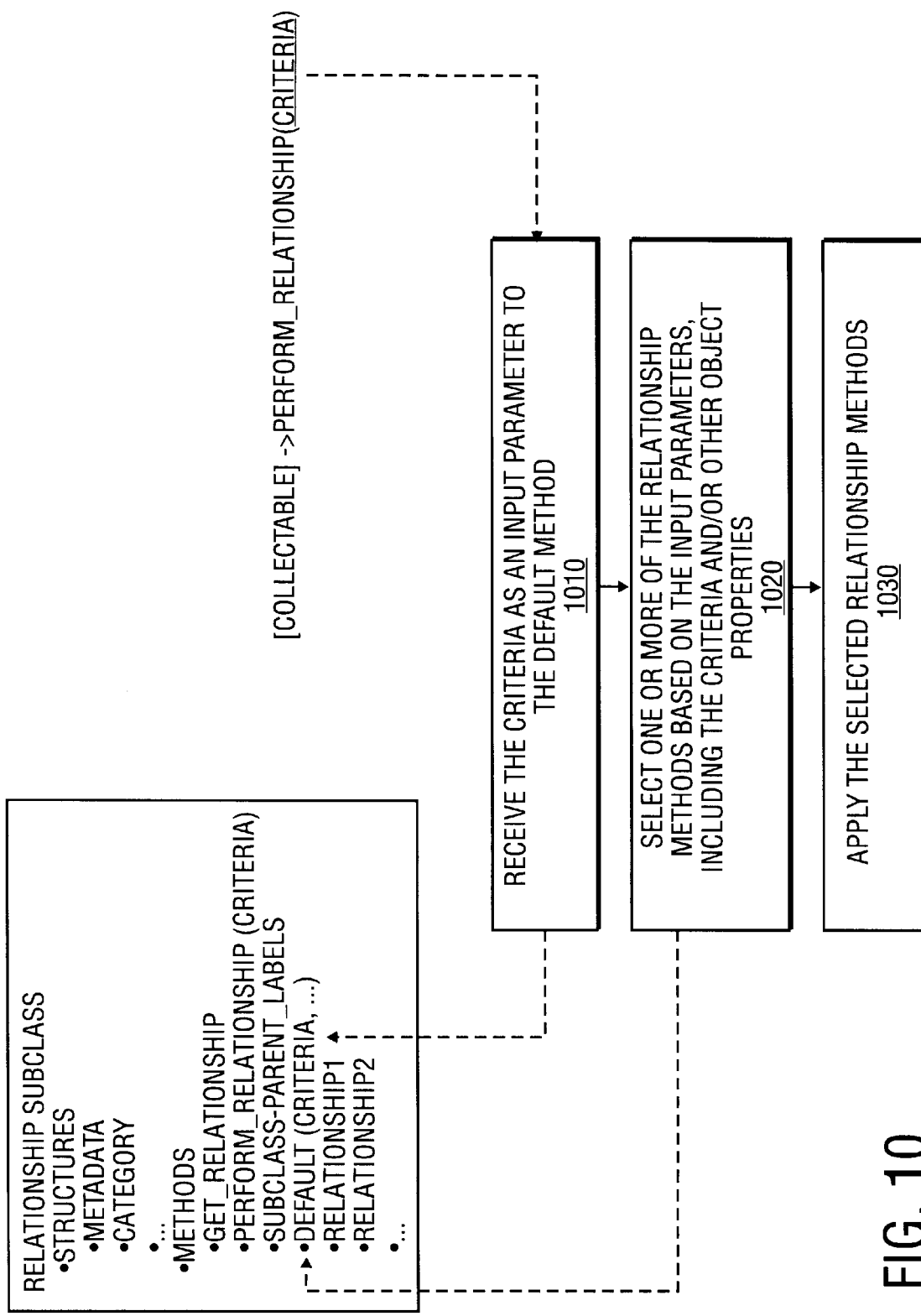
FIG. 10 illustrates the use of a RELATIONSHIP_SELECTION method as the DEFAULT method of a relationship object according to one embodiment of the invention.

FIG. 10 illustrates the use of a RELATIONSHIP_SELECTION method as the DEFAULT method of a relationship object according to one embodiment of the invention. For example, the flow diagram of FIG. 10 could be performed as part of block 850 of FIG. 8. FIG. 10 shows a request to apply the PERFORM_RELATIONSHIP method with the input parameter CRITERIA. In addition, FIG. 10 shows the relationship subclass including a DEFAULT, RELATIONSHIP1, and RELATIONSHIP2 methods.

In block 1010, the CRITERIA parameter to the PERFORM_RELATIONSHIP method is received as an input parameter to the DEFAULT method and control passes to block 1020. As previously stated, a RELATIONSHIP_SELECTION method has been stored as the DEFAULT method.

As a result, the RELATIONSHIP_SELECTION method is applied using the CRITERIA being received as an input parameter.

As shown in block 1020, application of the RELATIONSHIP_SELECTION method results in the selection of one or more of the relationship methods (e.g., RELATIONSHIP1, RELATIONSHIP2, etc.) based on the CRITERIA parameter. In one embodiment of the invention, the same type of identifiers used in the CAREGORY structure described above are used as the CRITERIA parameter when applying the RELATIONSHIP_SELECTION method. The RELATIONSHIP_SELECTION method is written to use the CRITERIA to identify which of the relationship methods in the relationship object are to be applied. Alternative embodiments can use other techniques, such as SQL statements. In certain embodiments, application of the RELATIONSHIP_SELECTION method causes the selection of one or more of the relationship methods based on other object properties in addition to and/or in place of the CRITERIA parameter. From block 1020, control passes to block 1030. In block 1030, the selected relationship methods are applied.

As described above, the PERFORM_RELATIONSHIP method causes the relationship methods that satisfy the CRITERIA to be applied on the items in the result collectable. In the described embodiment, two techniques for selecting the relationship methods specified by the CRITERIA parameter are supported. Specifically, if a single relationship method is being stored as the DEFAULT method of a given relationship object, locating that relationship object using the CAREGORY structure and executing the DEFAULT method satisfies the requirement. Alternatively, when multiple relationship methods need to be selected from a given relationship object, the identifiers for the multiple relationship methods are stored in the CAREGORY structure of that relationship object and a RELATIONSHIP_SELECTION method is stored as a DEFAULT method. In this situation, selecting the relationship objects that contain the appropriate entries in the CAREGORY structure based on the input CRITERIA reduces the number of relationship objects which must be considered. In other words, the use of the CAREGORY structure becomes a mechanism to locate objects with the required method, and the application of the RELATIONSHIP_SELECTION method selects the particular relationship method(s) to be applied.

While an embodiment is described that supports the two techniques for selecting the relationship methods specified by the CRITERIA parameter, alternative embodiments of the invention support only one of the two. For example, in one alternative embodiment, RELATIONSHIP_SELECTION methods are not supported, but each relationship object stores one relationship method as the DEFAULT method and the identifier for that relationship method is stored in the CAREGORY structure. As another example, another alternative embodiment of the invention dispenses with the use of identifiers in the CAREGORY structures to select the relationship methods to be applied, and instead relies on the use of RELATIONSHIP_SELECTION methods. Particularly, RELATIONSHIP_SELECTION methods are stored as the DEFAULT methods of each relationship object. Since a RELATIONSHIP_SELECTION method is stored as the DEFAULT method of each relationship object, the RELATIONSHIP_SELECTION method of each relationship object is applied responsive to the application of an PERFORM_RELATIONSHIP method. Each of these RELATIONSHIP_SELECTION methods selects form one or more other relationship methods in its' relationship object based on the CRITERIA used as the input parameter to the PERFORM_RELATIONSHIP method.

Figure 11:
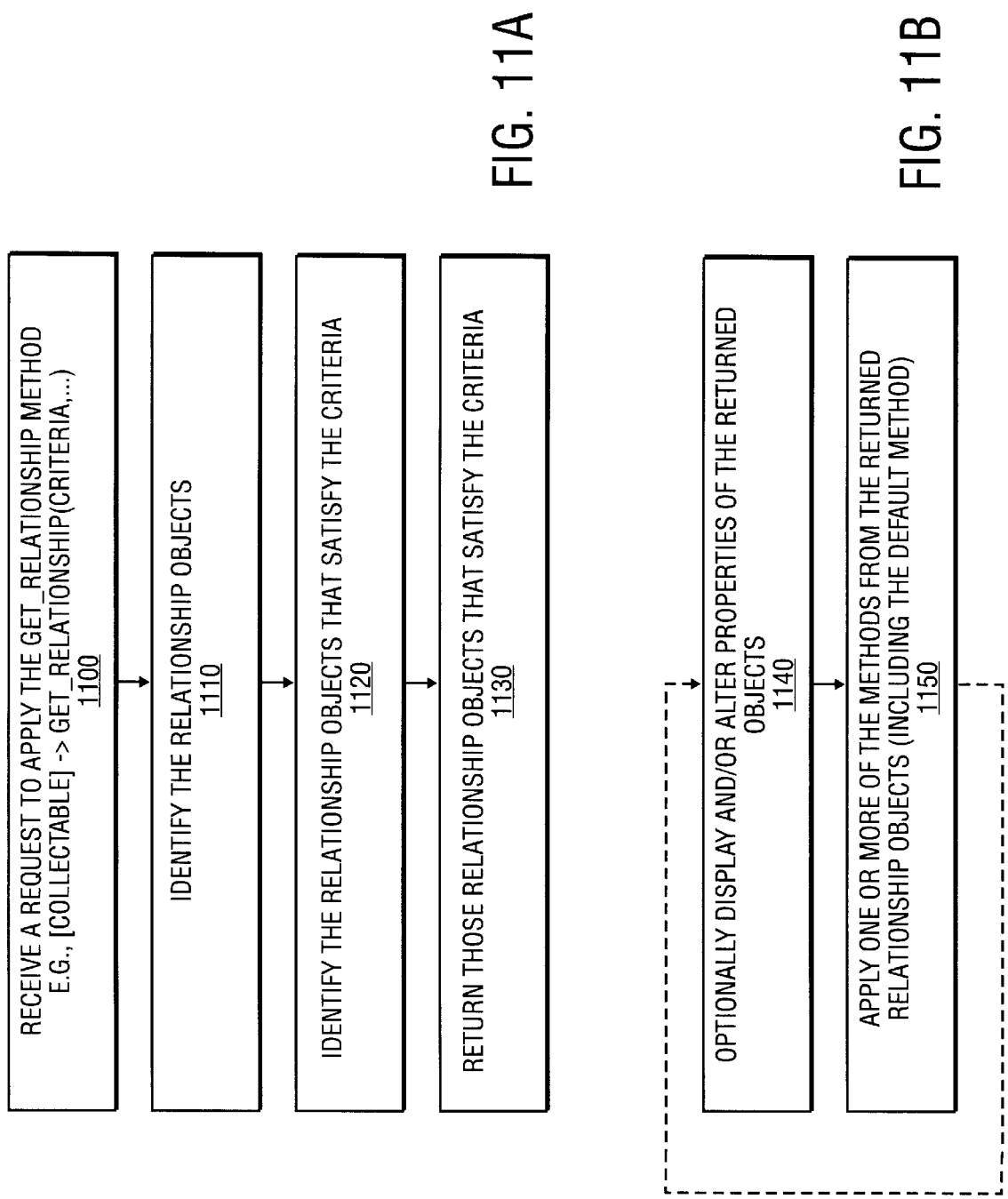
FIG. 11A is a flow diagram illustrating the GET_RELATIONSHIP method according to one embodiment of the invention.
FIG. 11B is a flow diagram illustrating actions that can be performed on the results returned form the GET_RELATIONSHIP method according to one embodiment of the invention.

Having described the PERFORM_RELATIONSHIP method, the GET_RELATIONSHIP method will now be described. FIG. 11A is a flow diagram illustrating the GET_RELATIONSHIP method according to one embodiment of the invention. In block 1100, a request to apply the GET_RELATIONSHIP method using the input parameter CRITERIA is received and control is passed to block 1110. According to one embodiment of the invention, this request has generally the same format as the PERFORM_RELATIONSHIP method request.

In block 1110, the relationship objects are identified and control passes to block 1120. Block 1110 can be performed in a manner similar to block 810 of FIG. 8.

As shown in block 1120, the relationship objects that satisfy the CRITERIA are identified and control passes to block 1130. Block 1120 can be performed in a similar manner to block 820.

In block 1130, those relationship objects that satisfy the CRITERIA are returned. In one embodiment, these returned relationship objects are then displayed to the entity (e.g., the administrator, the user, etc.) that submitted the request through an interface of the model engine.

FIG. 11B is a flow diagram illustrating actions that can be performed on the results returned form the GET_RELATIONSHIP method according to one embodiment of the invention. For example, the blocks on the flow diagram of FIG. 11B could be performed responsive to commands/queries submitted to the model engine by an entity, such as an administrator or user. In block 1140, properties of the returned objects are optionally displayed and/or altered. An exemplary manner of performing block 1140 is described herein with reference to FIG. 12. Form block 1140 control passes to block 1150.

In block 1150, one or more of the methods (including the default method) from the returned relationship objects is applied. Control optionally passes form block 1150 back to block 1140.

Figure 12:
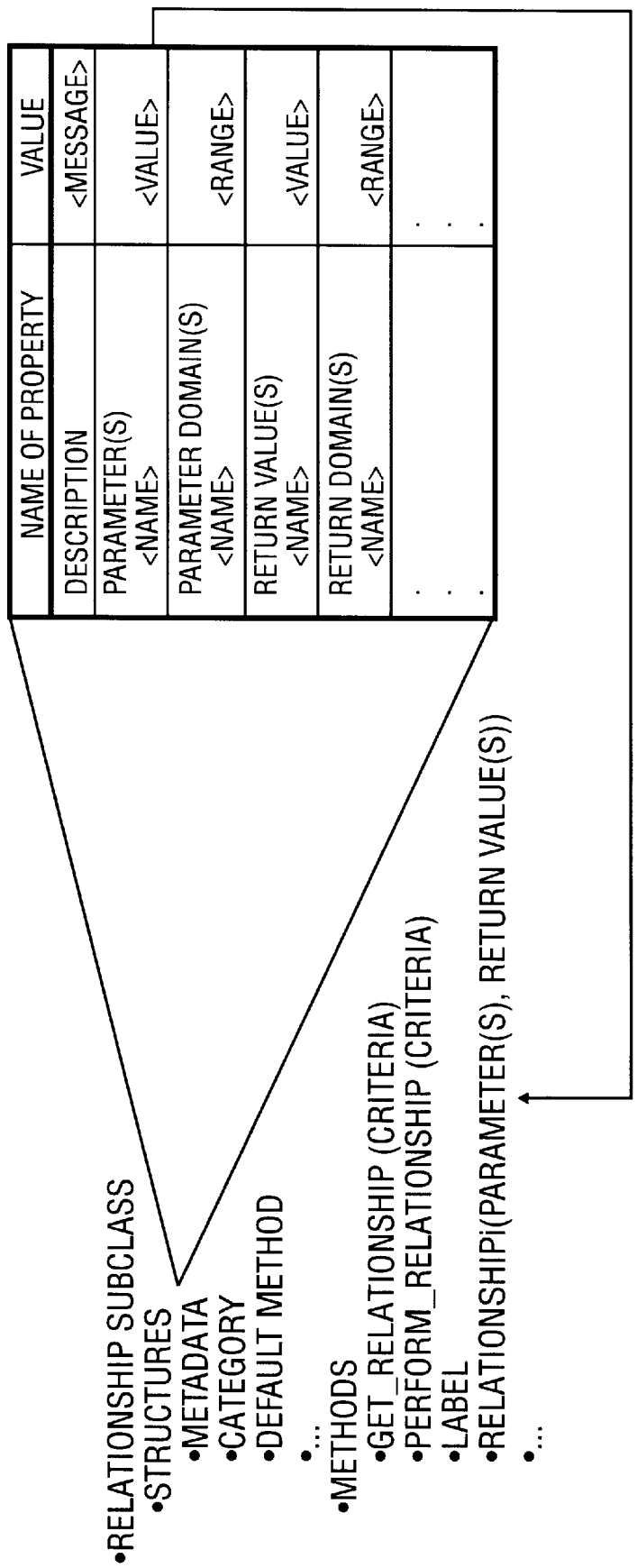
FIG. 12 is a block diagram illustrating an example of the metadata stored on the METADATA structure of the relationship subclass according to one embodiment off the invention.

FIG. 12 is a block diagram illustrating an example of the metadata stored on the METADATA structure of the relationship subclass according to one embodiment off the invention. In particular, FIG. 12 shows the relationship subclass includes RELATIONSHIPi. In addition, FIG. 12 shows the metadata stored in the METADATA structure includes the names of various properties, as well as values for those properties. In the example of FIG. 12, the following properties are stored: 1) a description of the RELATIONSHIPi method; 2) input parameters to the RELATIONSHIPi method; 3) domains for one or more of the input parameters to the RELATIONSHIPi method; 4) the types of values that are returned by the RELATIONSHIPi method; and 5) the domains of one or more of the values returned by the RELATIONSHIPi method.

Using the METADATA structure, an interface of the model engine can display information regarding instances of the relationship subclass to an administrator or user. Particularly, a user or administrator can inquiry a relationship object for the information in the METADATA structure of a given relationship object. Thus, the METADATA structure and the model engine expose metadata regarding instances of that subclass. In addition, the model engine can be written to allow the user to alter the values of the input parameters stored in the METADATA structure. In this manner, a user or administrator can dynamically change the manner in which the relationship methods output.

By way of example, assume a relationship object is created that stores a number of sorting algorithms as different relationship methods. In addition, assume the relationship object stores a RELATIONSHIP_SELECTION method for selecting from the different relationship methods. Additionally, assume the METADATA structure includes a value for an input parameter called partially sorted for the RELATIONSHIP_SELECTION method. Furthermore, assume the METADATA structure stores a domain for the parameter partially—sorted that indicates the domain is "yes" and "no." The model engine can be written to display this domain and request the user to select from the domain the appropriate value for the input parameter partially_sorted. Subsequently, when the RELATIONSHIP_SELECTION method is applied, the input parameter partially_sorted is used to select between different ones of the relationship methods to perform a sort.

While one embodiment has been described with various types of information stored in the METADATA structure, alternative embodiments can store more, less, and/or different types of information in the METADATA structure. In addition, while one embodiment has been described in which the exposed metadata is stored in the METADATA structure of the relationship subclass, alternative embodiments can store this type of metadata in other structures of a subclass. In addition, while one embodiment has been described in which the exposed metadata is interacted with responsive to an entity interfacing with the model engine, alternative embodiments can also provide for this interaction in an automated fashion (e.g., responsive to a given method, responsive to a given event, etc).

Figure 13A:
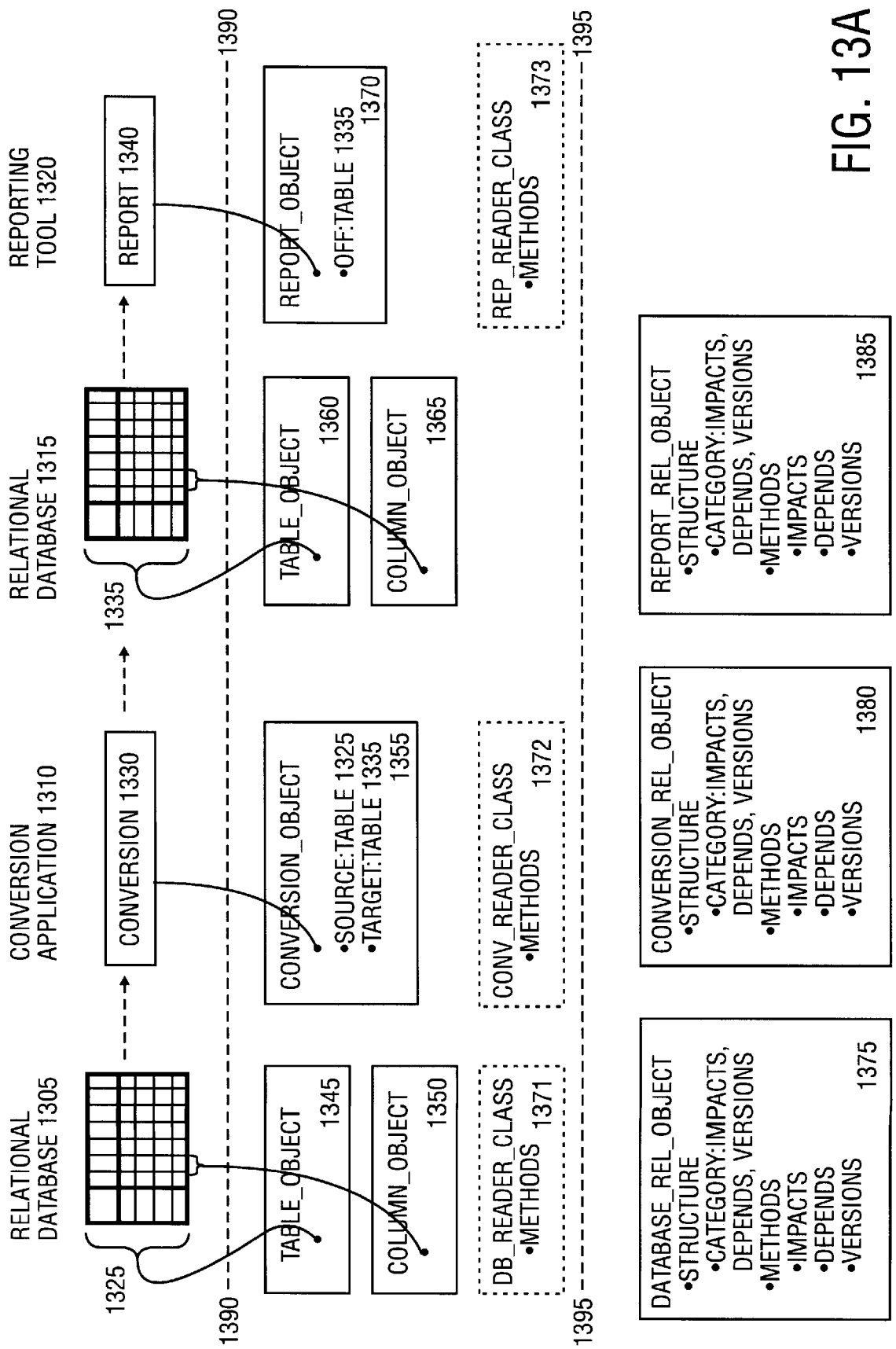
FIG. 13A is a conceptual block diagram illustrating an exemplary system according to one embodiment of the invention.

Having described the general infrastructure of one embodiment of the invention, several exemplary relationships will now be described. FIG. 13A is a conceptual block diagram illustrating an exemplary system according to one embodiment of the invention. While this system is described with respect to certain techniques described above, it should be understood that the various alternatives previously described herein are applicable to this system.

In FIG. 13A, the dashed line 1390 separates a set of disparate integration sources (above the line) from an integration layer. The dashed line 1395 divides that integration layer into relationship objects (below the line) form base objects and base classes.

With regard to the disparate integration sources, FIG. 13A shows: 1) a relational database 1305 including a table 1325; 2) a relational database 1315 including a table 1335; 3) a conversion application 1310 including a conversion 1330 that migrates aspects of the table 1325 to the table 1335; and 4) a reporting tool 1320 including a report 1340 that works off the table 1335. While various integration sources are shown in FIG. 13A, any number of different types of integration sources can be supported by the system.

With regard to the base subclasses of the integration layer of FIG. 13A, base subclasses for the following items are not shown but have been declared: 1) a table base class for tables such as tables 1325 and 1335; 2) a column base class for columns of tables such as tables 1325 and 1335; 3) a conversions base class for conversions such as the conversion 1330; and 4) a reports base class for reports such as the report 1340. FIG. 13A does show the following instances of these classes: 1) a TABLE_OBJECT 1345 for the table 1325; 2) a COLUMN_OBJECT 1350 for a column in the table 1325; 3) a CONVERSION_OBJECT 1355 for the conversion 1330; 4) a TABLE_OBJECT 1360 for the table 1335; 5) a COLUMN_OBJECT 1365 for a column in the table 1335; and 6) a REPORT_OBJECT 1370 for the report 1340.

As described later herein, these base classes are declared such that they contain data that describes those aspects of the underlying integration sources needed by the relationship methods to expose the interrelationships between the integration sources and/or the objects of the integration layer. For example, the TABLE_OBJECT 1345 and/or the COLUMN_OBJECT 1350 include data that describes their relationship (the COLUMN_OBJECT 1350 describes a column in the table identified by the TABLE_OBJECT 1345). As another example, the CONVERSION_OBJECT 1355 contains data that describes that the conversion 1330 migrates data from the table 1325 to the table 1335 (see the source and target of CONVERSION_OBJECT 1355). In addition, the REPORT_OBJECT 1370 contains data that indicates that the report 1340 works off the table 1335. While certain examples of data, stored in the base objects, indicating certain relationships between the disparate data sources and/or the base objects are described, any type of data and/or relationship can be stored in the objects.

With reference to the relationship subclass of the integration layer of FIG. 13A, the following derivatives of the relationship subclass are not shown but have been declared: 1) a derivative class for relationship objects regarding databases; 2) a derivative class for relationship objects regarding conversions; and 3) a derivative class for relationship objects regarding reports. FIG. 13A does show the following instances of each of these derivative classes: 1) a DATABASE_REL_OBJECT 1375; 2) a CONVERSION_REL_OBJECT 1380; and 3) a REPORT_REL_OBJECT 1385. Each of these relationship objects include methods for expressing the following relationships: 1) impacts; 2) depends; and 3) data_access. FIG. 13A also shows that the keywords for each of these methods have been included in the CAREGORY structure of each of these relationship objects.

FIG. 13A also illustrates a variety of base classes collectively referred to herein as the reader classes. In particular, FIG. 13A shows a DB_READER_CLASS 1371, a CONV_CLASS 1372, and a REP_READER_CLASS 1373. Each of the reader classes contain method(s) that provide access (read, write, view, etc.) to the underlying integration source for which they were created. As described later herein, the DATA_ACCESS methods allow an entity to locate the reader class of a given type and create an instance of that class. Creating an instance of one of these reader classes allows an entity (e.g., a user, administrator, or program) to access the underlying integration source. In this manner, a programmer having expertise in the accessing of an integration source can create one of these classes and any user can then create an instance of this class in order to gain access to that integration source.

FIG. 13B is a table providing a description of the relationship methods (IMPACTS, DEPENDS, and DATA ACCESS) for different types of base objects according to one embodiment of the invention. Each of these relationship methods will be described with reference to the PERFORM_RELATIONSHIP method previously described ([collectible]→PERFORM_RELATIONSHIP ([impacts and/or depends and/or data_access])).

The impacts relationship is used to identify whether a given item of an integration source has any effect on another item in that integration source and/or items in other integration sources. For example, the column identified by the COLUMN_OBJECT 1350 impacts the table 1325 identified by the table object 1345 because that column is part of the table 1325. As another example, the table 1325 of FIG. 13A impacts the table 1335 through the conversion 1330. The table 1325 impacts the table 1335 through the conversion 1330. The table 1335 impacts the report 1340.

Returning to FIG. 13B, the relationship method for the impacts relationship is different for each integration source. For example, the IMPACTS relationship method in the DATABASE_REL_OBJECT is "if 'C' is a column of table 'T,' then 'C' impacts 'T'." Thus, the table of 13B describes the methods shown in the DATABASE_REL_OBJECT 1375, the CONVERSION_REL_OBJECT 1380 and the REPORT_REL_OBJECT 1385.

To provide a particular example, assume that the following request is made:

COLUMN_OBJECT 1350→PERFORM_RELATIONSHIP (impacts)

In response to this request, the application of the PERFORM_RELATIONSHIP method of the COLUMN_OBJECT 1350 will cause the flow diagram illustrated in FIG. 8 to be performed. As such, the relationship objects 1375, 1380 and 1385 will be identified as the relationship objects containing relationship methods of the type impacts. Through the previously described DEFAULT mechanism and RELATIONSHIP_SELECTION method, the IMPACTS relationship methods would then be applied. For example, the IMPACTS method of the DATABASE_REL_OBJECT 1375 would be performed using the COLUMN_OBJECT 1350 as an input parameter.

Figure 14:
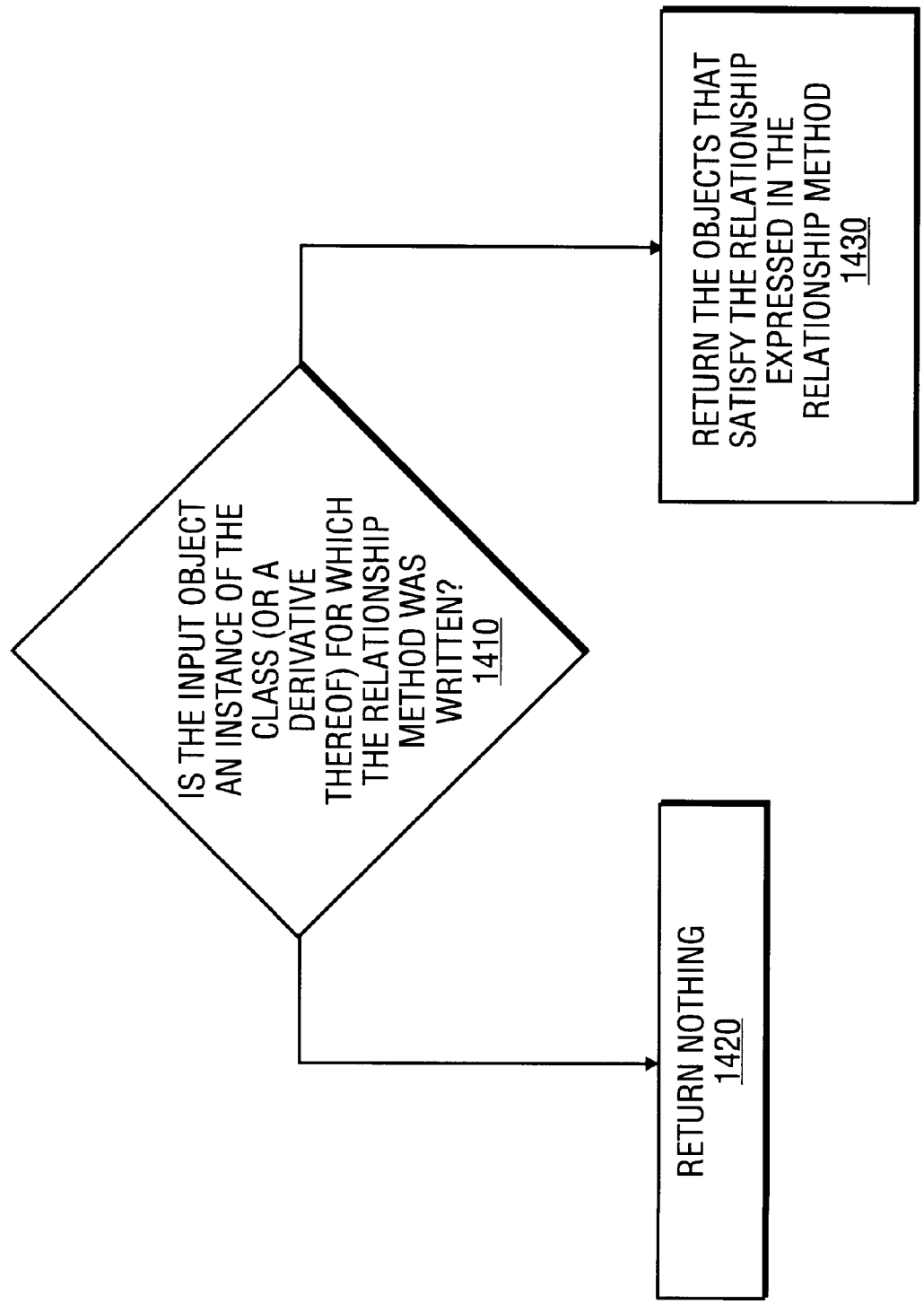
FIG. 14 is a flow diagram illustrating the application of a relationship method according to one embodiment of the invention.

FIG. 14 is a flow diagram illustrating the application of a relationship method according to one embodiment of the invention. To continue the above example, the flow diagram of FIG. 14 is performed as part of block 850 of FIG. 8 in response to the application of the IMPACTS method from the DATABASE_REL_OBJECT 1375 on the COLUMN_OBJECT 1350.

Each of the relationship objects 1375, 1380, and 1385 includes relationship methods that were written to operate on base class types (and derivatives thereof) declared for the underlying integration sources for which they were named. For example, the IMPACTS relationship method from the DATABASE_REL_OBJECT 1375 was written to operate on instances of the column base class type (of which COLUMN_OBJECT 1350 is an instance). As another example, the IMPACTS relationship method from the CONVERSION_REL_OBJECT 1380 was written to operate on instances of the conversion base class type (of which CONVERSION_OBJECT 1355 is an instance). The base class type for which a given relationship method was written is referred to herein as the relationship method's class type.

Although the relationship methods are written for particular base class types and derivatives thereof, each of the IMPACTS relationship methods of the relationship objects 1375, 1380, and 1385 will be applied to the COLUMN_OBJECT 1350. Thus, the application of a given relationship method typically results in an inspection of the input object to determine whether that input object is of the appropriate base class type or derivative thereof (see block 1400).

In one embodiment of the invention, whether the input object's class type matches or is a derivative of the relationship's class type is determined using the SUBCLASS-PARENT_LABEL methods. Particularly, in one embodiment of the invention, the SUBCLASS-PARENT_LABEL method for the base subclasses is written as follows:

if [the relationship method's class type]=[the current class type] then return 1;

else return PARENT_CLASS:: SUBCLASS-PARENT_LABEL ([the current class type]);

whereas the SUBCLASS-PARENT_LABEL method for the superclass is written to return 0. Initially, the [current class type] is the class type of the input object. The SUBCLASS-PARENT_LABEL methods provide a mechanism by which recursive calls are made in the class hierarchy until either: 1) a match is found ([the relationship method's class type]=[the current class type]) and a 1 is returned; or 2) the superclass is reached and a 0 is returned. In other words, a bottom up searching mechanism is provided for the class hierarchy that allows the method to identify if the input object is an instance of the relationship method's class type (or a derivative thereof).

Thus, if a 1 is returned by the SUBCLASS-PARENT_LABEL method, the input object is an instance of the relationship method's class type (or derivative thereof) and control passes to block 1410. However, if a 0 is returned by the SUBCLASS-PARENT_LABEL method, the input object is not an instance of the relationship method's class type (or derivative thereof) and control passes to block 1420.

For example, when the IMPACTS method from the DATABASE_REL_OBJECT 1375 is applied using the COLUMN_OBJECT 1350 as an input parameter, control passes to block 1410. In contrast, when the IMPACTS method from the relationship objects 1380 and 1385 are applied using the COLUMN_OBJECT 1350 as an input parameter, control passes to block 1420.

In block 1410, the objects that satisfy the relationship expressed in the relationship method are returned. For example, when the IMPACTS method from the DATABASE_REL_OBJECT 1375 is applied using the COLUMN_OBJECT 1350 as an input parameter, the TABLE_OBJECT 1345 is returned (see FIG. 13B). As previously stated, various mechanisms can be used to expose the relationship between the base objects, such as the COLUMN_OBJECT 1350 and the table object 1345. For example, an object can store hard pointer(s) to the objects that they impact or depend on. As another example, indexes can be created during instance initialization that express certain relationships. As another example, an exhaustive search can be performed to identify a relationship.

Thus, the flow diagram of FIG. 14 is applied for each relationship method as described in block 850 of FIG. 8. FIG. 15 is a table illustrating the processing of the exemplary request COLUMN_OBJECT 1350 →PERFORM_RELATIONSHIP(impacts) according to one embodiment of the invention. Thus, FIG. 15 illustrates the creation of a result collectable containing the results of applying all IMPACTS relationship methods on all required objects throughout the integration layer. In particular, FIG. 15 illustrates the processing in block 850 of FIG. 8 when the completion CRITERIA is until the result collectable no longer increases in size. As illustrated in FIG. 15, the result collectable includes the COLUMN_OBJECT 1350, the TABLE_OBJECT 1345, the CONVERSION_OBJECT 1355, the TABLE_OBJECT 1360, and the REPORT_OBJECT 1370.

Having described the impacts relationship, the depends relationship will now be described. The depends relationship is basically the reverse of the impacts relationship. Thus, the report 1340 identified by the REPORT_OBJECT 1370 depends on the table 1335 identified by the TABLE_OBJECT 1360. The table 1335 depends on the column identified by the COLUMN_OBJECT 1365. The table 1335 depends on the table 1325 as a result of the conversion 1330 identified by the CONVERSION_OBJECT 1355. The table 1325 identified by the TABLE_OBJECT 1345 depends on the column of the table 1325 identified by the COLUMN_OBJECT 1350. Thus, the following request would generate a result collectable containing the base objects 1370, 1360, 1365, 1355, 1345, and 1350:

REPORT_OBJECT 1370→PERFORM_RELATIONSHIP (depends)

Thus, the impacts and/or depends relationships provide a mechanism by which the affects of changes to a integration source and/or an object in the integration layer can be determined. For example, if changing the table 1325 is being contemplated, the impacts and/or depends relationships can be used to respectively determine how that change will affect other aspects of the system.

Having describe the impacts and depends relationships, the data_access relationship will be described. The DATA_ACCESS method allows an entity to locate the reader class of a given type and create an instance of that class. Creating an instance of one of these reader classes allows an entity (e.g., a user or administrator) to access the underlying integration source. In this manner, a programmer having expertise in the accessing of an integration source can create one of these classes and any user can then create an instance of this class in order to gain access to that integration source.

For example, assume the following request is received:
TABLE_OBJECT 1345→PERFORM_RELATIONSHIP(data_access)

Responsive to this request, the DATA_ACCESS methods from each of the relationship objects 1375, 1380, and 1385 would be applied. However, since only the DATA_ACCESS method of the DATABASE_REL_OBJECT 1375 operates on the class type of the TABLE_OBJECT 1345, only the DATA_ACCESS method of the DATABASE_REL_OBJECT 1375 will return a result. In particular, the DATA_ACCESS method of the DATABASE_REL_OBJECT 1375 will cause an instance of the DB_READER_CLASS 1371 to be created and returned. With this instance, the requester can then access the tables of the relational database 1305.

Having described various exemplary relationship methods, it should be understood that any number of different relationships can be expressed in the relationship objects, including relationships between relationship methods, between objects in the integration layer, and between integration sources. For example, in the background an example was discussed in which a first stored procedure was used to generate a report from a first integration source. This first procedure used a second procedure when generating that report (e.g., the second procedure converted date information from a given format to the Julian format). Thus, the first procedure depends on the first integration source and the second procedure. Although this dependency exists, the prior art provided no mechanism for readily exposing these dependencies. In contrast, embodiments of the invention can express the relationship between the first and second procedures in the same manner described above for the integration sources.

As another example, a relationship called "related," which is a union of the IMPACTS and DEPENDS methods, can be created. By way of particular example, assume a system is created having separate relationship objects each having one of the following methods: IMPACTS, DEPENDS, and RELATED. These relationship objects will respectively be referred to as the impacts_relationship_object, the depends_relationship_object, and the related_relationship_object. As such, assume the following request is submitted:

[collectable]→PERFORM_RELATIONSHIP (related).

In response to this request, the related_relationship_object would be returned and the RELATED method from that object would be applied. This RELATED method is written to cause the following to be applied:

[items from result collectable]→PERFORM_RELATIONSHIP (depends); and

[items from result collectable]→PERFORM_RELATIONSHIP (impacts).

Thus, this recursive calling would create a result collectable containing the union of the DEPENDS and IMPACTS methods.

In addition, the system can also implement the depends and impacts relationships for the related_relationship_object. With reference to the depends relationship, the related_relationship_object can include a DEPENDS method. In operation, when the following request is received:

related_relationship_object→PERFORM_RELATIONSHIP (depends).

the related_relationship_object will be identified, the DEPENDS method from that object will be applied, and the application of that DEPENDS method on the input object related_relationship_object will return all relationship objects: 1) that contain impacts or depends in their CAREGORY structure(s); and/or 2) that are of a declared relationship class type impacts or depends. Alternative embodiments can be written to locate one of: 1) all relationship objects with a certain identifier(s) (e.g., impacts) in their CAREGORY structure(s); or 2) objects of a particular class type.

With reference to the impacts relationship, another relationship object class type can be used referred to herein as the related_impacts_relationship class. An instance of this relationship class type (referred to herein as an related_impacts_relationship_object) is created. The related_impacts_relationship_object includes in its' CAREGORY structure an identifier for an IMPACTS method and includes an IMPACTS method. When this IMPACTS method is applied on a depends_relationship_object, this IMPACTS method returns the first related_relationship_object located. Thus, when the following request is received:

depends_relationship_object→PERFORM_RELATIONSHIP (impacts).

the related_impacts_relationship_object will be identified, the IMPACTS method from that object will be applied, and the application of that IMPACTS method on the input object related_impacts_relationship_object will return the first relationship object: 1) that contain "related" in its' CAREGORY structure(s); and/or 2) that is of a declared relationship class type related. Again, alternative embodiments can be written to locate one of: 1) the first located relationship object with a certain identifier in its' CAREGORY structure(s); or 2) the first object located of a particular class type.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A system comprising:
   a plurality of integration sources including a relational database table, a conversion application, and a reporting application; and
   an object-oriented data warehouse including,
      a plurality of base objects that include data describing said plurality of integration sources, and
      a plurality of relationship objects each of which corresponds to one of said plurality of base objects, said plurality of relationship objects including relationship methods to be applied on the corresponding plurality of base objects to express relationships between different ones of the plurality of base objects.

2. The system of claim 1, wherein at least certain of said relationship methods express relationships between different ones of the plurality of relationship objects.

3. The system of claim 1, wherein:
   said relationship methods are made up of different groups according to the type of relationship expressed; and
   said system further comprising,
      a model engine to locate the plurality of relationship objects in said system according to the type of relationship expressed.

4. The system of claim 1, wherein certain of said relationship methods express that data of its relationship object's corresponding base object's corresponding integration source is used by another integration source.

5. The system of claim 1, wherein certain of said relationship methods express that data of its relationship object's corresponding base object's corresponding integration source is generated from data in another integration source.

6. The system of claim 1, wherein:

said relationship methods are made up of different groups according to the type of relationship expressed, and said plurality of base objects each include a get_relationship method, which when applied, causes a processor to locate those of the plurality of relationship objects that include relationship methods of a particular one of said types identified as a parameter to said get_relationship method.

7. The system of claim 6 wherein said plurality of base objects each include a perform_relationship method, which when applied, causes a processor to apply said get_relationship method and to apply a default one of the methods in each of the relationship objects located by the application of the get_relationship method.

8. The system of claim 7, wherein the default methods are the relationship methods of the particular one of said types.

9. The system of claim 7, wherein each of the default methods, when applied by a processor, causes the processor to select the relationship method in its relationship object of the particular one of said types.

10. The system of claim 1, wherein:

said relationship methods are made up of different groups according to the type of relationship expressed, and said plurality of base objects each include a perform_relationship method, which when applied, causes a processor to create a result set including the result of applying all of the relationship methods of a particular one of said types.

11. The system of claim 1, wherein certain of said plurality of relationship objects includes a metadata structure having stored therein properties regarding the one or more relationship methods included in its relationship object.

12. The system of claim 11, wherein said properties include a name and a value for at least certain of the input parameters to each of the one or more relationship methods in its relationship object.

13. The system of claim 11, wherein said properties also include a range of acceptable values for at least certain of the input parameters named to each of the one or more relationship methods in its relationship object.

14. The system of claim 11, wherein said properties include a name and domain for each of the return values of each of the one or more relationship methods in its relationship object.

15. The system of claim 1, wherein said relationship methods are made up of different groups according to the type of relationship express, said types are predetermined and each is assigned a unique label, and each of said plurality of relationship objects have stored therein the unique labels of the types of relationships expressed by its one or more relationship methods.

16. The system of claim 15, wherein said object-oriented data warehouse further comprises:

a model engine to view the types of relationships already expressed by the relationship methods according to their underlying base objects and to create an additional relationship object of a given one of said types.

17. An object-oriented data warehouse comprising:

a plurality of relationship objects collectively including a plurality of relationship methods, the plurality of relationship methods being made up of different groups according to the type of relationship expressed, a unique identifier being associated with each of said types, each of said plurality of relationship objects including, at least one said plurality of relationship methods, and a category structure to store the unique identifier of each of said types of relationship methods in the relationship object; and a plurality of base objects each including, data describing one of a plurality of disparate integration sources, and a method having a parameter to identify at least one of the unique identifiers, said method, when applied, causes a processor to locate all of the plurality of relationship objects whose category structure includes the parameter.

18. The method of claim 17 wherein each of said plurality of relationship methods is to be applied on one or more of said plurality of base objects.

19. The object-oriented data warehouse of claim 17 wherein one of the one or more relationship methods in each of said plurality of relationship objects is a default method.

20. The object-oriented data warehouse of claim 17 wherein a first of the plurality of relationship objects includes:

at least one relationship method of at least two of said types; and a method, which when applied, causes a processor to select one of the relationship methods included in the first relationship object based on the parameter.

21. The object-oriented data warehouse of claim 20, wherein the method whose application causes the selection of one of the relationship methods is a default method.

22. The object-oriented data warehouse of claim 17, wherein said method also causes, for each of the located relationship objects, the application of the one of said relationship methods associated with the parameter.

23. The object-oriented data warehouse of claim 22, wherein said method also causes the creation of a result set including the results of applying all required relationship methods on all required ones of said plurality of base and relationship objects needed to satisfy the relationship specified by the parameter.

24. The object-oriented data warehouse of claim 17, further comprising:

a set of one or more object-tracking structures, wherein the one or more classes of which the plurality of relationship objects are instances are each assigned a unique label, said set of object-tracking structures having stored therein a top-down representation of the hierarchy of the classes with reference to the labels, and having stored therein a distinguishing identifier assigned to each of the relationship objects stored according to the labels.

25. The object-oriented data warehouse of claim 17, wherein the base and relationship objects belong to a class hierarchy, each class in the class hierarchy being assigned a distinguishing label, each subclass having stored therein its label and the label of its parent's class, at least a first of the subclasses including, a first method, applied in response to class initialization, causes a processor to add that classes' unique label to a set of object-tracking structures that track a top-down representation of the hierarchy of said classes with reference to the unique labels, and a second method, applied in response to instance initialization, causes a processor to add an identifier assigned to said instance to said set of object tracking structures under the label of its class.

26. The object-oriented data warehouse of claim 17, wherein each of said plurality of relationship objects corresponds to one of said plurality of base objects, and wherein one relationship method of a first of said plurality of relationship objects expresses a relationship of that relationship object's corresponding base object's integration source to another part of that integration source or another of the plurality of disparate integration sources.

27. The object-oriented data warehouse of claim 17, wherein each of said plurality of relationship objects corresponds to one of said plurality of base objects, and wherein each of the relationship methods of said plurality of relationship objects expresses a relationship regarding that relationship object's corresponding base object's integration source.

28. The object-oriented data warehouse of claim 17, wherein said method is in each of said plurality of base objects.

29. The object-oriented data warehouse of claim 17, wherein said method also causes the processor to add the base object from whence the method was applied to a result collectible, apply one of the relationship methods from each of the selected relationship objects on the objects in the result collectible, and add the results to the result collectable.

30. The object-oriented data warehouse of claim 29, wherein said method also causes repetitively applying the one of the relationship methods from each of the selected relationship objects on the results added to the result collectable until a completion criteria is met.

31. The object-oriented data warehouse of claim 30, wherein the completion criteria is met when the result collectible no longer increases in size.

32. The object-oriented data warehouse of claim 30, wherein the results can include different ones of said plurality of base objects and different ones of said plurality of relationship objects.

33. The object-oriented data warehouse of claim 17, wherein each of said plurality of relationship objects also includes:

a metadata structure having stored therein properties regarding the at least one or more relationship methods included in its relationship object.

34. The object-oriented data warehouse of claim 33, wherein said properties include a name and value for at least certain of the parameters to certain of the one or more relationship methods in its relationship object.

35. The object-oriented warehouse of claim 34, wherein properties include a range of acceptable values for at least certain of the parameters named in the metadata structure.

36. The object-oriented data warehouse of claim 33, wherein said properties include a name and domain for at least one of the return values of each of at least one or more relationship methods in its relationship object.

37. A machine readable medium having stored thereon:

an object-oriented class hierarchy including a parent class with a plurality of derivative classes, each of said classes being assigned a unique label, each of said derivative classes having stored therein its label and the label of the parent class, each of the derivative classes including, a first method, applied in response to class initialization, that causes a processor to add that classes' unique label to a set of object-tracking structures that track a top-down representation of the hierarchy of said classes with reference to the unique labels, and a second method, applied in response to instance initialization, that causes a processor to add an identifier assigned to said instance to said set of object-tracking structures under the label of its class.

38. A computer implemented method comprising:

creating a first instance of a class in an object-oriented class hierarchy, said class and the parent of said class in the class hierarchy having each been assigned unique labels that are stored in said class;

applying a first method of said first instance, which when applied, causes a processor to add the unique label of the class to a set of object tracking structures that store a top-down representation of the classes in the class hierarchy with reference to the unique labels; and applying a second method of said first instance, which when applied, causes a processor to, create a second instance of said class, and add an identifier assigned the second instance to the set of object tracking structures under the unique label of the class.

39. The method of claim 38, wherein said unique labels of said class and its parent are stored in a method of said class.

40. A machine-readable medium having stored thereon instructions, which when executed by a set of one or more processors, causes said set of processors to perform the following:

applying a method from a base object, said applying of said method including a parameter specifying one of a plurality of types of relationships as a current relationship of interest, said base object being one of a plurality of base objects each including data describing one of a plurality of disparate integration sources, said applying causing, identifying a subset of a plurality of objects in an object-oriented data warehouse that are relationship objects, said relationship objects collectively storing a plurality of relationship methods, wherein each of the relationship methods of said plurality of relationship objects expresses a relationship regarding that relationship object's corresponding base object's integration source, and identifying a subset of the relationship objects that include relationship methods that satisfy said parameter.

41. The machine-readable medium of claim 40, wherein:

the one or more classes of which the plurality of relationship objects are instances are each assigned a unique label, and said identifying said subset of said plurality of objects further comprises, accessing a set of one or more object tracking structures that store a top-down representation of the hierarchy of the classes with reference to the labels, and further have stored therein a unique identifier assigned each of said relationship objects according to the labels.

42. The machine-readable medium of claim 41, said identifying said subset of the relationship objects further comprises:

determining if a category structure in each of said relationship objects has stored therein a unique relationship method type identifier assigned the current relationship of interest, wherein the plurality of relationship methods are made up of different groups according to the type of relationship expressed, a unique relationship method type identifier having been assigned to each of said types, each relationship object having stored in its category structure the unique relationship method type identifier assigned to each of the one or more of the plurality of relationship methods stored in that relationship object.

43. The machine-readable medium of claim 40, said identifying said subset of the relationship objects further comprises:

determining if a category structure in each of said relationship objects has stored therein a unique relationship method identifier assigned the current relationship of interest, wherein the plurality of relationship methods are made up of different groups according to the type of relationship expressed, a unique relationship method type identifier having been assigned to each of said types, each relationship object having stored in its category structure the unique relationship method type identifier assigned to each of the one or more of the plurality of relationship methods stored in that relationship object.

44. The machine-readable medium of claim 40, said identifying said subset of the relationship objects further comprises:

accessing a table having stored therein data identifying which relationship methods are stored in which of the relationship objects.

45. The machine-readable medium of claim 40, wherein:
said parameter is a set of one or more SQL statements; and
said identifying said subset of the relationship objects further comprises performing said set of SQL statements.

46. The machine-readable medium of claim 40, said applying said method from said base object further comprises:

for at least a first of the relationship methods that satisfies the parameter and that is associated with a first of the subset of the relationship objects, displaying properties stored in a metadata structure of that first relationship object regarding the first relationship method.

47. The machine-readable medium of claim 46, said displaying further comprises:

displaying a name and value for each of the parameters to the first relationship method.

48. The machine-readable medium of claim 46, said displaying further comprises:

displaying a range of acceptable values for each of the parameters to the first relationship method.

49. The machine-readable medium of claim 46 further comprises:

applying the first relationship method with the values for the parameters stored in the metadata structure of the first relationship object.

50. The machine-readable medium of claim 40, said applying said method from said base object further comprises:

applying the relationship methods, which satisfy said parameter, on said base object.

51. The machine-readable medium of claim 50, wherein said applying the relationship methods further comprises:

applying a default method from each relationship object in said subset of the relationship objects, said default method for at least one of the relationship objects causing said set of processors to,
identify which of the set of one or more of the relationship methods associated with that relationship object expresses the current relationship of interest, and
apply that relationship method.

52. The machine-readable medium of claim 40, said applying said method from said base object further comprises:

placing said base object in a result collectible,
applying the relationship methods that satisfy said parameter on the objects in the result collectible,
placing the results of the applying of the relationship methods into the result collectible, and
repeating said applying the relationship methods and the placing the results until a completion criteria is met.

53. The machine-readable medium of claim 52, wherein said applying the relationship methods further comprises:

applying a default method from each relationship object in said subset of the relationship objects, said default method for at least one of the relationship objects causing said set of processors to,
identify which of the set of one or more of the relationship methods associated with that relationship object expresses the current relationship of interest, and
apply that relationship method.

54. The machine-readable medium of claim 52, wherein said completion criteria is met when the size of the result collectable no longer increases in size.

55. A machine-readable medium having stored therein instructions, which when executed by a set of one or more processors, causes said set of processors to perform the following:

applying a method from a base object, said applying of said method including a parameter specifying one of a plurality of types of relationships as a current relationship of interest, said base object being one of a plurality of base objects each including data describing one of a plurality of disparate integration sources, wherein each of a plurality of relationship objects corresponds to one of said plurality of base objects and includes a set of one or more relationship methods, wherein each of the relationship methods expresses one of the plurality of types of relationships regarding its relationship object's corresponding base object's integration source, said applying said method from said base object causing,
adding said base object to a result collectible,
applying at least certain of the relationship methods on the newly added contents of the result collectible,
adding the results of the applying at least certain of the relationship methods to the result collectible, and
repeating said applying at least certain of the relationship methods and the adding the results until a completion criteria is met.

56. The machine-readable medium of claim 55, wherein said applying at least certain of the relationship methods further comprises:

identifying a set of one or more of the plurality of relationship objects that each include one or more relationship methods that satisfy said parameter,
applying relationship methods from only the set of relationship objects.

57. The machine-readable medium of claim 56, wherein said applying relationship methods from only the set of relationship objects includes applying only those relationship methods from the set of relationship objects that satisfy said parameter.

58. The machine-readable medium of claim 56, said applying relationship methods from only the set of relationship objects includes:

applying a default method from each relationship object in said set of the relationship objects, said default method for at least one of the relationship objects causing said set of processors to, identify which of the set of one or more of the relationship methods associated with that relationship object expresses the current relationship of interest, and apply that relationship method.

59. The machine-readable medium of claim 55, wherein applying at least certain of the relationship methods on the contents of the result collectible includes:

applying a default method from each relationship object, said default method causing said set of processors to, identify which, if any, of the set of one or more of the relationship methods associated with that relationship object expresses the current relationship of interest, and apply that relationship method.

60. The machine-readable medium of claim 55, wherein applying at least certain of the relationship methods on the contents of the result collectible includes:

applying a default method from each relationship object, said default being one of said relationship methods, said default method returning null if said default method does not express the current relationship of interest.

61. The machine-readable medium of claim 55, wherein said completion criteria is met when the size of the result collectable no longer increases in size.

62. The machine-readable medium of claim 55, wherein:

the plurality of base objects is made up of a plurality of different types created for the plurality of disparate integration sources or parts thereof; and each of the relationship methods were written for application on the type of its corresponding base object; and each relationship method, when applied, causes said set of processors to perform the following, checking if the base object from the result collectable upon which the relationship method is currently being applied is of the matching type, and if not of the appropriate type, returning data indicating nothing is to be added to the result collectable.

63. The machine-readable medium of claim 62, wherein said checking includes checking the class of the base object and all parent classes of that class.

64. The machine-readable medium of claim 62, wherein the results of the application of the relationship methods when applied to one of the plurality of base objects of the matching type can return one or more of the plurality of base and relationship objects.

65. The machine-readable medium of claim 62, wherein:

each class in the class hierarchy of which the plurality of base and relationship objects are instances is assigned a unique label;

each relationship method has associated with it the unique label assigned the class of the base object for which it was written; and said checking includes, comparing the label associated with the relationship method to the label assigned the class of which the base object is an instance.

66. The machine-readable medium of claim 65, wherein said checking also includes:

if the label associated with the relationship method does not match the label assigned the class of which the base object is an instance, working up the class hierarchy until either a label is found that matches the label associated with the relationship method or a completion criteria is met.

* * * * *